(12) United States Patent
Fairweather

(10) Patent No.: US 8,015,175 B2
(45) Date of Patent: Sep. 6, 2011

(54) LANGUAGE INDEPENDENT STEMMING

(76) Inventor: John Fairweather, Santa Monica, CA (US)

( * ) Notice: Subject to any disclaimer, the term of this patent is extended or adjusted under 35 U.S.C. 154(b) by 334 days.

(21) Appl. No.: 11/687,402

(22) Filed: Mar. 16, 2007

(65) Prior Publication Data
US 2008/0228748 A1   Sep. 18, 2008

(51) Int. Cl.
*G06F 7/00* (2006.01)
*G06F 17/30* (2006.01)
(52) U.S. Cl. ......... 707/713; 707/736; 707/758; 707/759
(58) Field of Classification Search .............. 707/3, 713, 707/736, 758, 759
See application file for complete search history.

(56) References Cited

U.S. PATENT DOCUMENTS

| | | | | |
|---|---|---|---|---|
| 5,708,829 | A * | 1/1998 | Kadashevich et al. | 715/236 |
| 5,963,205 | A * | 10/1999 | Sotomayor | 715/236 |
| 5,963,893 | A * | 10/1999 | Halstead et al. | 704/9 |
| 6,012,053 | A * | 1/2000 | Pant et al. | 1/1 |
| 6,035,269 | A * | 3/2000 | Kim | 704/9 |
| 6,175,834 | B1 * | 1/2001 | Cai et al. | 1/1 |
| 6,338,057 | B1 * | 1/2002 | Weeks | 1/1 |
| 6,347,295 | B1 * | 2/2002 | Vitale et al. | 704/209 |
| 6,401,060 | B1 * | 6/2002 | Critchlow et al. | 704/1 |
| 7,039,631 | B1 * | 5/2006 | Finger, II | 1/1 |
| 7,382,358 | B2 * | 6/2008 | Kushler et al. | 345/168 |
| 2002/0021838 | A1 * | 2/2002 | Richardson et al. | 382/181 |
| 2003/0182529 | A1 * | 9/2003 | Fairweather | 711/170 |
| 2004/0024720 | A1 * | 2/2004 | Fairweather | 706/46 |
| 2004/0243388 | A1 | 12/2004 | Corman et al. | 704/1 |
| 2005/0055200 | A1 * | 3/2005 | Park | 704/4 |
| 2005/0190973 | A1 * | 9/2005 | Kristensson et al. | 382/229 |
| 2005/0197828 | A1 | 9/2005 | McConnell et al. | 704/9 |
| 2006/0173886 | A1 | 8/2006 | Moulinier et al. | 707/101 |

OTHER PUBLICATIONS

Hull, David A., "Stemming Algorithms—A Case Study for Detailed Evaluation", Rank Xerox Research Centre, Jun. 7, 1995.*
Dawson, J. L., "Suffix Removal and Word Connation," 1974, in *ALLC Bulletin*, vol. 2, No. 3, pp. 33-46.
Frakes, W. B., "Term Conflation for Information Retrieval," 1982, PhD. Dissertation, Syracuse University, pp. 1-134.
Krovetz, R., "Viewing Morphology As an Inference Process," 1993, in R. Korfhage et al., *Proceedings 16th International ACM SIGIR Conference*, Pittsburgh, PA, Jun. 27-Jul. 1, 1993; pp. 191-202.

(Continued)

*Primary Examiner* — Jean B Fleurantin
*Assistant Examiner* — Mark E Hershley
(74) *Attorney, Agent, or Firm* — Stanley J. Gradisar Attorney At Law LLC; Stanley J. Gradisar

(57) ABSTRACT

A stemming framework for combining stemming algorithms together in a multilingual environment to obtain improved stemming behavior over any individual stemming algorithm, together with a new language independent stemming algorithm based on shortest path techniques. The stemmer essentially treats the stemming problem as a simple instance of the shortest path problem where the cost for each path can be computed from its word content and its number of characters. The goal of the stemmer is to find the shortest path to construct the entire word. The stemmer uses dynamic dictionaries constructed as lexical analyzer state transition tables to recognize the various allowable word parts for any given language in order to obtain maximum speed. The stemming framework provides the necessary logic to combine multiple stemmers in parallel and to merge their results to obtain the best behavior. Mapping dictionaries handle irregular plurals, tense, phrase mapping and proper name recognition.

25 Claims, 6 Drawing Sheets

OTHER PUBLICATIONS

Lennon, M., Pierce, D. S., Tarry, B. D., and Willett, P., "An Evaluation of Some Conflation Algorithms for Information Retrieval," Mar. 1981, in *Journal of Information Science*, 3, pp. 177-183.

Lovins, J. B., "Development of a Stemming Algorithm," Jun. 1968, *Mechanical Translation and Computational Linguistics*,: vol. 11, Nos. 1 & 2, pp. 22-31.

Paice, C. D., "Information Retrieval and the Computer," 1977, MacDonald & Jane's, London, Chapter 4, pp. 71-121.

Porter, M. F., "An Algorithm for Suffix Stripping," Jul. 1980, in *Program*, 14 (No. 3), pp. 130-137.

Ulmschneider, J. and Doszkocs, T., "A Practical Stemming Algorithm for Online Search Assistance," 1983, *Online Review*, vol. 7, No. 4, pp. 301-318.

International Search Report dated Aug. 6, 2008 in International Application Serial No. PCT/US08/56857 and filed Mar. 13, 2008.

* cited by examiner

LANGUAGE INDEPENDENT STEMMING

CROSS-REFERENCES TO RELATED APPLICATIONS

This application is related to co-pending application Ser. No. 10/357,326 filed on Feb. 3, 2003 titled "Method for Analyzing Data and Performing Lexical Analysis" by the same inventor of this invention, now U.S. Pat. No. 7,328,430 issued on Feb. 5, 2008, and to co-pending application Ser. No. 10/357,288 filed on Feb. 3, 2003 titled "System and Method For Managing Memory" by the same inventor of this invention, now U.S. Pat. No. 7,103,749 issued on Sep. 5, 2006, both of which are incorporated herein by reference in their entirety for all that is taught and disclosed therein.

BACKGROUND

A significant problem encountered in text searching and retrieval systems is how to maximize the relevance and accuracy of the hits returned in response to a query. This problem is made difficult by the fact that in essentially all languages, words are made up by modifying root words to indicate such things as plurals, tense, verbs, nouns and various other parts of speech. In English, and many other languages this is done by attaching suffixes to the word so that, for example, the words teach, teachings, teachers etc. are all variations of the root word teach. When a user issues a query such as "find me all documents about teaching" the query system cannot simply look for the word teaching otherwise most of the relevant documents may not be found. It must instead try to find all word variants derived from the root "teach" and return those documents in which any such variant occurs.

There are two basic strategies available to do this. The first strategy is to maintain a dictionary of every variant of every word in the language and when the "teaching" query is issued, translate it into a more complex query looking for every variant. The second strategy is to incorporate a stemming algorithm into both the querying and the indexing process such that all word variants based on the same root are stemmed (that is they have their suffixes stripped) and indexed/queried via the root word. For example, the "teaching" query is stemmed to "teach" and it is hoped that due to the identical stemming in the indexing phase, this will retrieve all the relevant documents. The problem with the huge dictionary approach is that because there are an almost infinite variety of word forms in most languages, these dictionaries can be completely unmanageable. In addition, the corresponding queries must contain large numbers of "OR" terms which therefore run slowly resulting in unacceptable performance. For this reason, virtually all text search systems have adopted the stemming approach since it can be made very fast and efficient.

Stemming algorithms today utilize knowledge of the specific language involved in order to recognize and strip off probable suffixes from a word. Thus the simplest possible stemming algorithm in English (referred to as the "Simple" stemmer shown below) might be implemented as follows:

```
if ( word ends in "ies" and (word does not end in "eies" or "aies") then
    replace "ies" by "y"
else if ( word ends in "es" and (word does not end in "aes" or "oes") then
    replace "es" by "e"
```

-continued

```
else if ( word ends in "s" and ( word does not end in "us" or "ss") then
    remove the "s"
else
    no action
```

Even the trivially simple algorithm above contains a great deal of English specific knowledge such as the fact that "ies" is usually the plural of a word ending in "y." There are a number of well know stemming algorithms that apply to the English language, the most prevalent and famous of which is the "Porter" stemmer (described by M. F. Porter in 1980). Other English language stemming algorithms include the "Krovetz" inflectional stemmer (1993), and the "Lovins" stemmer (1968) which has two variants (the "Iterated Lovins" stemmer is used below). There are a number of less well know stemming algorithms, though none has measurably improved on that of Porter. All of these stemming algorithms embody very detailed knowledge of the English language in order to make appropriate substitutions, and all of them operate by suffix stripping only.

There is a need therefore in the art for a single stemming algorithm that can be applied to all known languages regardless of script system, without the need to modify the code in any way, allowing it to be adapted for a language by any non-technical person fluent in that language, which has an accuracy near 100% in all languages, which can conflate roots between languages to form a single searchable root set over all languages, and which is not hopelessly slow in order to achieve all this. Such a stemming algorithm could revolutionize text searching as currently practiced. The stemming framework and stemming algorithm disclosed herein together meet these and other needs in the art.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein is a unique stemming framework for combining stemming algorithms together in a multilingual environment in order to obtain improved stemming behavior over any individual stemming algorithm, together with a new and unique language independent stemming algorithm based on shortest path techniques. The stemming algorithm disclosed herein is based on the premise that in essentially all languages, it is possible to construct all word variations from the following basic pattern:

[Prefix] Root {[Infix] Root} [Suffix]

Where "[ . . . ]" implies zero or one occurrence and "{ . . . }" implies zero, one, or more occurrences. In this pattern, the following word components are defined:

(1) Prefix—A prefix modifier that will be discarded (or converted to a separate root word) on output. An example is the prefix "un" (meaning not) in the word "unbelievable." This will be converted to the form "not believe" as a result of prefix recognition.

(2) Root—A root word fragment in the language. An example is the word "teach" which is the root of "teaching," "teachers," "taught," etc. The fragment may differ from the actual root and is mapped to the true root as a result of stemming.

(3) Infix—An infix modifier occurring within a compound word which will be discarded (or converted to a separate root word) on output. Infixes are rare in English, but common in some other languages where words are assembled out of smaller fragments. An example of an infix sequence in English might be "s" as in the dual root word "woodsman."

(4) Suffix—A suffix modifier that will be discarded (or converted to a separate root word) on output. Examples in English are such endings as "ing," "s," "able," etc. As noted above, standard English stemming algorithms tend to focus on suffix stripping only.

Given this model, the stemmer essentially treats the stemming problem not as a linguistic problem, but as a simple instance of the shortest path problem (e.g., the traveling salesman problem) where the cost for each path can be computed from its word component and the number of characters in it. The goal of the stemmer disclosed herein is to find the shortest (i.e., lowest cost) path to construct the entire word. The stemmer uses dynamic dictionaries constructed as lexical analyzer state transition tables to recognize the various allowable word parts (via a unique dynamic table driven lexical analyzer) for any given language in order to obtain maximum speed. The stemming framework disclosed herein provides the necessary logic to combine multiple stemmers in parallel and to merge their results to obtain the best behavior, it also provides mapping dictionaries to overcome the shortcomings of many classical stemmers by handling such things as irregular plurals, tense, phrase mapping and proper name recognition (to prevent name stemming).

DETAILED DESCRIPTION

Figure 1:
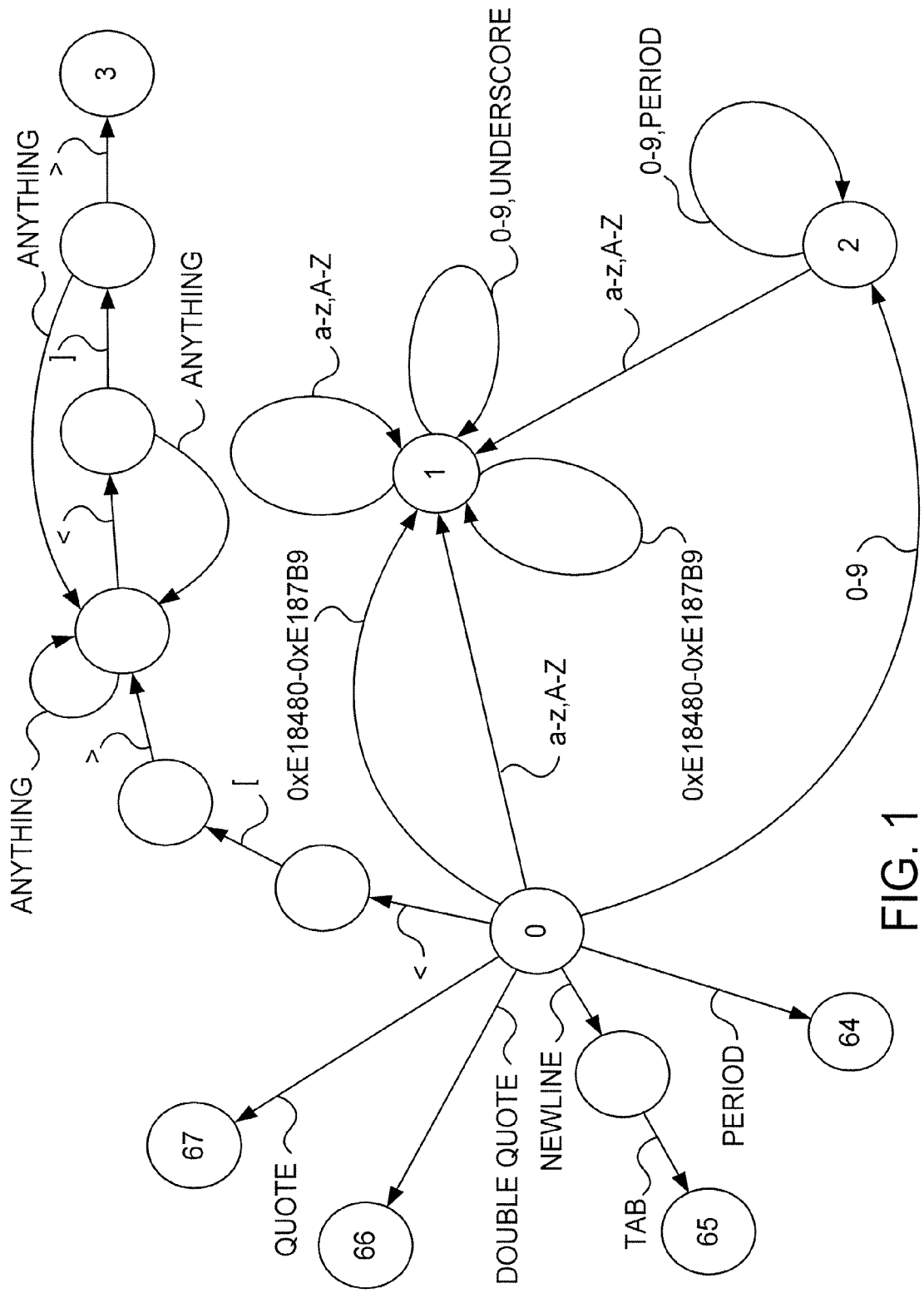
FIG. 1 shows the lexical analyzer state transition diagram necessary to implement the "scanWord" plug-in required by the stemming framework for the Korean language.

The invention may be implemented as a computer process, a computing system, or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

Table 1 shows the results of stemming a small set of similar English words using the stemming algorithms discussed above. The first column (Input) shows the input word. The second column (Selected Output) shows the selected stemmed output (chosen from all stemmer outputs as discussed below). The third column (Fairweather) shows the output from the stemmer disclosed in detail below. The fourth column (Porter) shows the output from the Porter stemmer. The fifth column (Krovetz) shows the output from the Krovetz stemmer. The sixth column (Simple) shows the output from the Simple stemmer. Finally, the seventh column (Iterated Lovins) shows the output from the Iterated Lovins stemmer. A '-' in a column indicates that the stemmer either made no change or failed to stem. Correct output from a stemmer that matches the Selected Output column is shown as underlined text in Table 1.

TABLE 1

| Input | Selected Output | Fairweather | Porter | Krovetz | Simple | Iterated Lovins |
|---|---|---|---|---|---|---|
| abaculus | abacus | <u>abacus</u> | abaculu | — | — | — |
| abacuses | abacus | <u>abacus</u> | <u>abacus</u> | — | abacuse | abac |
| abaxial | not axis | <u>not axis</u> | abaxi | — | — | abax |
| abbacies | abbot | <u>abbot</u> | abbaci | abbacy | abbacy | ab |
| abbatical | abbot | abbot | abbat | — | — | abbat |
| abdominally | abdomen | <u>abdomen</u> | abdomin | — | — | abdomin |
| abdominoanterior | abdomen anterior | <u>abdomen anterior</u> | — | — | — | — |
| abdominothoracic | abdomen thorax | abdomen ͺhorax | abdominothorac | — | — | abdominothorac |
| aberrantly | aberrant | <u>aberrant</u> | aberrantli | — | — | aber |
| aberration | aberrant | <u>aberrant</u> | aberr | — | — | aber |
| adjurdicating | abjurd | — | <u>abjurd</u> | adjurdicate | — | <u>abjurd</u> |
| abnormality | not normal | <u>not normal</u> | abnorm | — | — | abnorm |
| abnormalization | not normal | <u>not normal</u> | abnorm | — | — | abnorm |
| aboveground | above ground | <u>above ground</u> | — | — | — | — |
| abstention | abstain | <u>abstain</u> | abstent | — | — | abst |
| abusively | abuse | <u>abuse</u> | abus | — | — | abus |
| academization | academic | <u>academic</u> | academ | — | — | academ |
| accelerometer | accelerate meter | <u>accelerate meter</u> | acceleromet | — | — | — |
| reptilian | reptile | <u>reptile</u> | — | — | — | reptil |
| taught | teach | <u>teach</u> | — | — | — | — |
| teachability | teach able | <u>teach able</u> | teachabl | — | — | teach |
| teachableness | teach able | <u>teach able</u> | teachabl | — | — | teach |
| teachings | teach | <u>teach</u> | teach | — | teaching | <u>teach</u> |
| woodsmen | wood man | <u>wood man</u> | — | — | — | woodsm |
| Percent Correct | | 100.0% | 12.5% | 0.0% | 0.0% | 8.3% |

In all cases for the set of words shown in Table 1, the output from the Fairweather stemmer disclosed herein is correct. The reasons for this will be discussed below. In examining the output from the other stemmers, it can be seen that there is a great deal of variation between them, and that to a greater or lesser degree all of the currently known stemmers exhibit the following classes of problems:

(1) The stemmed outputs are usually not actual words but are instead word fragments. This is not generally an issue since stemmer outputs are rarely displayed, but are only used for searching, where the only important thing is that all variants of a root word map to the same root. Nonetheless, if producing correct output were a performance criterion, the highest score for any existing stemmer would be 12.5% for the "Porter" stemmer, closely followed by 8.3% for the "Iterated Lovins" stemmer. The Fairweather stemmer disclosed herein scores 100.0% by this measure (including correctly rejecting a misspelling—"abjurdicating").

(2) The stemmers have no ability to conflate words that should yield the same root but are quite different (the words "abaculus" and "abacuses" above are an example which should conflate to "abacus").

(3) The stemmers only handle suffix stripping, they cannot handle prefix stripping (see the word "abnormality" where the prefix "ab" means "not"). Prefix stripping is virtually impossible with standard stemming algorithms since it can easily destroy valid words beginning with the same prefix. The list above has many words beginning with "ab" yet in only three cases (out of 24) should "ab" be treated as a prefix.

(4) The stemmers cannot handle compound words, i.e., those made up of multiple roots (see the words "abdominoanterior," "abdominothoracic," "aboveground" and "accelerometer" in the list above).

(5) The stemmers cannot handle words containing multiple roots connected by infix sequences (see the word "woodsmen" above where the "s" is an infix sequence connecting the two roots "wood" and "man" in which "men" must be recognized as an irregular plural of "man").

(6) The stemmers cannot conflate irregular plurals (e.g., "men" and "man" above), nor can they handle irregular tenses (e.g., "taught" and "teach" above).

(7) The stemmers often map words that should have different root meanings onto the same root (see examples below).

(8) The stemmers do a very poor job even of conflating words with differing suffixes onto the same root (e.g. "teachability," "teachableness," and "teachings" above).

(9) The stemmers cannot conflate word variants, that is, words whose spelling varies depending on the part of speech (e.g., the word "abstain" and "abstention").

(10) The stemmers cannot preserve and output semantic meaning of suffixes where necessary (the word "accelerometer" above is an example of the common suffix "ometer," a better example might be the word "clueless" which should result in the output "without clue" as a result of preserving the meaning of the recognized suffix "less."

To get a better handle on the impact of stemming on the relevance of search results, one must query a large corpus with each stemmer and then manually examine each document to see how accurate the returned results were. This is a very labor-intensive process and the results can be highly domain dependant. For this reason there is very little hard data available on stemmer accuracy in a general sense. In order to get some feel for stemmer "meaning" accuracy, that is, how accurately does each stemmer map morphological variants to the same "meaning" root, applicant typed in every word and its morphological variants from a single page of the unabridged dictionary, then dumped the various stemmer results, shown below in Table 2. By examining how many such words are mapped to the correct unique root (even if that root is a meaningless fragment), a true measure of how good a job each of the stemmers is doing in terms of search accuracy can be ascertained.

TABLE 2

| Input | Selected Output | Fairweather | Porter | Krovetz | Simple | Iterated Lovins |
|---|---|---|---|---|---|---|
| divide | divide | divide | divid | — | — | div |
| divinable | divination | divination | divin | — | — | divin |
| divination | divination | divination | divin | — | — | div |
| divinatory | divination | divination | divinatori | — | — | divin |
| divine | divine | divine | divin | — | — | div |
| divined | divine | divine | divin | — | — | divin |
| divinely | divine | divine | divin | — | — | divin |
| divineness | divine | divine | divin | — | — | divin |
| diviner | divination | divination | divin | — | — | — |
| divinest | divine | divine | — | — | — | — |
| diving | dive | dive | dive | — | — | div |
| divining | divining | divining | divin | — | — | divin |
| divinise | divine | divine | divinis | — | — | divin |
| divinities | divine | divine | divin | divinity | divinity | divin |
| divinity | divine | divine | divin | — | — | divin |
| divinization | divine | divine | divin | — | — | divin |
| divinize | divine | divine | divin | — | — | divin |
| divinized | divine | divine | divin | divinize | — | divin |
| divinizing | divine | divine | divin | divinize | — | divin |
| divinyl | divinyl | divinyl | — | — | — | divin |
| divinylbenzene | divinyl benzene | divinyl benzene | divinylbenzen | — | — | divinylbenz |
| divisi | divide | divide | — | — | — | div |
| divisibility | divide | divide | divis | — | — | div |
| divisible | divide | divide | divis | — | — | div |
| divisibleness | divide | divide | divis | — | — | div |
| divisibly | divide | divide | divisibli | — | — | div |
| division | divide | divide | — | — | — | div |
| divisional | divide | divide | division | — | — | div |
| divisionally | divide | divide | division | — | — | div |

TABLE 2-continued

| Input | Selected Output | Fairweather | Porter | Krovetz | Simple | Iterated Lovins |
|---|---|---|---|---|---|---|
| divisionary | divide | divide | divisionari | — | — | div |
| divisionism | divide | divide | division | — | — | div |
| divisionist | divide | divide | — | — | — | div |
| divisive | divide | divide | divis | — | — | div |
| divisively | divide | divide | divis | — | — | div |
| divisiveness | divide | divide | divis | — | — | div |
| divisor | divide | divide | — | — | — | div |
| Percent Correct | | 100.0% | 33.3% | 0.0% | 0.0% | 72.2% |

Once again, the output from the Fairweather stemmer disclosed herein is correct. But notice that some of the words are very difficult to distinguish by any simple stemming algorithmic means. Take for example the words "diviner" and "divining" which all other stemming algorithms that succeed in stemming, incorrectly map to the root "divine" as opposed to "divination" which has a very different meaning. Calculating the most generous count of the number of correct unique root word conflations for each stemming algorithm above given this page of the dictionary, the "Porter" stemmer is correct 33.3% of the time and the "Iterated Lovins" stemmer 72.2% of the time, and the others are correct 0.0% of the time. In fact, as can be seen from the list above, the Iterated Lovins stemmer is an extremely aggressive stemmer, and had the next few pages of the dictionary been typed in, it would show that most of the words stemmed to "div." Studies by other researchers have shown that the "Iterated Lovins" stemmer actually performs significantly worse than the "Porter" stemmer for any realistic input, and for this reason the "Porter" stemmer, despite having an accuracy no better than approximately 30%, has become the dominant stemming algorithm used by most text searching systems today for the English language. Because of the poor performance of today's stemming algorithms, there is considerable debate in the community as to whether they actually do any significant good in improving search results. Clearly any stemming algorithm that could improve search accuracy from 30% to close to 100% in text search engines without adversely impacting performance would be highly desirable.

Table 3 presents the execution times for the various stemming algorithms under identical circumstances (stemming a word list of 350,000 different English words) as multiples of the execution time of the Porter stemming algorithm:

TABLE 3

| Algorithm | Execution Time |
|---|---|
| Simple | 0.25 |
| Porter | 1.0 |
| Krovetz | 0.5 |
| Iterated Lovins | 1.0 |
| Fairweather | 2.8 |

From Table 3 it is clear that the execution time of all the stemming algorithms discussed is not that dissimilar. The impact of stemmer execution time is primarily on the indexing phase of database construction, and in this context there is little to choose between them. In this test, the Porter stemmer was stemming at the rate of approximately 55,000 words per second.

Thus far only the English language has been discussed where stemming technology is the most advanced, in part because of the relative ease of stemming by suffix stripping in English. If the discussion is broadened to other languages and other script systems, the situation becomes far worse. Most languages have no stemmer available. However, the Porter algorithm has been adapted to handle many European languages (Latin languages) since they are actually quite similar in form. Porter provided the stemmer definition language "Snowball" in order to make the creation of such stemmers easier. Almost all languages are more inflected than English, and as a consequence these variants of the Porter stemmer generally have inferior performance compared to the English version. When the script system is changed to Arabic, Korean, Japanese, or any of the countless other script systems, stemmers are few and far between, and their performance to date has generally been abysmal compared to English. The reason for this is that these other languages can contain words that are essentially equivalent to an English sentence, and thus the stemmer would have to handle multiple roots, prefixes, suffixes and even infixes, which make the creation of effective stemming algorithms by current techniques almost impossible. Additionally, in scripts other than the Latin script, it is no longer possible to encode characters of the script in a single byte as it is with English, and thus any given character in the word may be physically represented in memory by anything from two to six bytes in a UTF-8 encoded text stream (Unicode UTF-8 has become the predominant standard for encoding text on computer systems). This more complex encoding makes it impossible to treat text in the simple manner found in standard stemmers, and forces people to create stemmers for non-Latin scripts by converting text into weird English letter encodings, stemming the converted text, and then converting the results back. To further complicate things, characters in other scripts can be modified by diacritic marks (the French circumflex accent is an example) and these may, or may not, modify the meaning. The end result of all this is that stemming in languages other than English is patchy or non-existent and requires highly skilled linguists and programmers if it is to be attempted. This means that the quality of search in foreign languages is generally much worse than that in English. The idea of a system capable of searching across all languages through a single query, regardless of the language of the searcher, is no more than a pipe dream, since such would require a standardized stemmer capable of near 100% accuracy in all languages and able to correctly extract all meaningful roots (not just word fragments) and map them to a single set of roots that have a common meaning across languages.

Before describing the shortest path stemming algorithm, a description will be given of the stemming framework for which this stemming algorithm is just the principal (and may be the only) member of a number of possible language-specific registered plug-ins. The stemming framework seeks to integrate available stemming algorithms for a language into a unified whole in order to obtain stemming results that are superior to any given stemming algorithm in isolation. The stemming framework provides the logic for intelligently combining stemmer results and also provides additional logic and mapping dictionaries, invoked through registered plug-ins, in order to overcome the limitations of existing stemming algorithms by handling those situations that cannot be easily solved algorithmically such as irregular word forms.
Stemming Framework The stemming framework supports the following language specific registered plug-ins which are sufficient to allow the stemming framework to invoke all stemming behaviors that are language specific while allowing all other logic to be handled by the stemming framework itself. These plug-ins are registered symbolically with the stemming framework during program initialization by language name, and plug-in name, as follows:

"makeStemmerContext"—This plug-in is called during stemming framework initialization for each language registered. The stemming framework provides and maintains a language-specific stemmer context allocation which is passed to all plug-ins for that language when they are subsequently invoked. This context structure can be used by the stemmer to store whatever information and dictionaries it needs as part of its operation. Context allocations must start with a "basic" context structure containing information needed by the stemming framework itself, and which is sufficient to support operation of the disclosed stemming algorithm, without the need for any additional context, in cases where no other stemming algorithm is available for the target language.

"killStemmerContext"—This plug-in is called by the stemming framework during stemming framework termination for each language registered. The purpose of this callback is to allow cleanup of whatever custom context and allocations were stored by the stemmer during the corresponding "makeStemmerContext" call.

"invokeStemmer"—This plug-in actually invokes the stemmer(s) registered for the language by calling QX_UniversalStemmer( ), and allows any necessary language specific pre- and post-processing to be performed on the text. For UTF-8 text streams pre- and post-processing is rarely required.

"scanWord"—This plug-in is called by the stemming framework in order to extract the next word in the language from the incoming text stream, in order to pass that word to the language-specific stemmer(s) for stemming. Word scanning is preferably accomplished by a call to the lexical analyzer described herein. The only difference between one language and the next is essentially the range of valid UTF-8 characters that are allowed in the language involved.

"prepareForIndexing"—This plug-in is called by the stemming framework on a block of text to be stemmed prior to beginning the word-by-word stemming process. The purpose of "prepareForIndexing" is to scan through the text converting it all to lower case (if appropriate in the script involved) while preserving and protecting from stemming any proper names, acronyms and other specialized words that should not be stemmed. Words that are to be protected are wrapped in the source text by inserting enclosing delimiter sequences, thus causing the stemming algorithm to skip over the word without processing it. This plug-in is designed to overcome the tendency of conventional stemming algorithms to stem words that should be left un-altered, for example without this step, the proper name "Hastings" will be stemmed by the "Porter" stemmer to "hast" which will be conflated with words derived from the root "haste" resulting in incorrect search results.

Given these plug-ins, which will be discussed in detail later, other than housekeeping functions, there is just one function that represents the primary interface to the disclosed stemming framework hereinafter referred to as QX_UniversalStemmer( ). This function is invoked by the language specific "invokeStemmer" plug-ins in order to perform the actual stemming operation. Regardless of language, "invokeStemmer" plug-ins are typically virtually identical and would appear as follows:

```
IvokeStemmer    (                    // Language "invokeStemmer"
    char            **text block,    // IO:Input/Output text
    const char      *language,       // I:Language name
    anonPtr         context,         // IO:Context for stemmer
    int32           options,         // I:Various logical options
    ...                              // I:Other parameters
                    )
{
    char            buffer[ ];
    determine from options if root mapping is required
    output text = allocate storage for output text
    Perform language specific pre-processing (not normally required)
    for ( cp = start of text block ; more text remains ; cp +=
    charsConsumed )
    {
        skip over any leading white space & transfer to buffer
        QX_UniversalStemmer(cp, buffer,...,&charsConsumed,...)
        if (root mapping is required )
            QX_MapRootsToEnglish(buffer)
        Append buffer to output text
    }
    replace text block by output text
    de-allocate output text
    Perform language specific post-processing (not normally required)
}
```

The additional parameters implied by the ellipses parameter " . . . " in the function prototype above include such things as references to the inverted file index (if appropriate), and additional context information that are not relevant to describing the stemming algorithm itself. The function QX_MapRootsToEnglish( ) is provided by the stemming framework and uses the root word mapping dictionary described below in order to convert any text in the output buffer to the equivalent English text wherever a root word mapping can be found from the native language stemmed root to an English root word(s). The purpose of this logic is to implement the conflation of roots into a common cross-language root set, which in this implementation has been chosen to be the English roots. The form of the "invokeStemmer" plug-in allows it to be called from a database subsystem during indexing and furthermore allows the creation of both a native roots index file (to allow language specific search) as well as a mapped roots index file (to allow cross-language search) simply by calling the stemming plug-in twice with different parameters. The plug-in is also called on query terms in order to convert the query words into the appropriate stemmed equivalents so that the database can efficiently search the inverted index file(s).

The stemming framework function QX_UniversalStemmer( ) performs the following logical steps in order to combine the results from one or more stemming algorithms for the language concerned, as well as handle basic dictionary mapping to improve current generation stemmer behavior (though this is not necessary for the stemming algorithm disclosed herein):

(1) Check in the phrases dictionary (if present) and if recognized, replace by the phrase meaning text.

(2) Check in the tense dictionary and if recognized, replace by current tense root and continue.
(3) Check in the irregular plurals form dictionary and if recognized, replace by the singular root and continue.
(4) Check in the fix up dictionary, which performs any early mappings not covered by the phrases, tense, and plurals dictionaries, and if recognized, replace by the mapped form and continue.
(5) If any change made above, return.
(6) Temporarily truncate the input at the first word boundary (if more than one word present).
(7) Check the stop-word dictionary and if found, discard/ignore.
(8) If the word is less than 'minLength' letters, don't stem it.
(9) Check if the word exists in the stemmed root word dictionary (rootsH) (a dictionary of all the know stemmed root words for the language) and if it does, don't stem it.
(10) Check against history as follows:
  (a) If 'cache' supplied then,
    (i) If the word is already in the cache, return the previous cached result,
  (b) Else check if the word already exists in the stemmed inverted file(s) and if it does, don't stem it.
(11) Stem the word in parallel using each stemming algorithm supplied in the 'algorithms' list and if a stemming action results:
  (a) If the stemming algorithm is the "Fairweather" stemmer,
    (i) Accept the stem and return the result (this stemmer is reliable!)
  (b) Else if a stemmed root word dictionary (rootsH) is present:
    (i) If stem word in dictionary OR original word not in dictionary,
      (1) Accept the potential stem,
    (ii) Else,
      (1) Discard the potential stem,
  (c) Else accept the potential stem.
(12) If no change or stemming occurred, done.
(13) Check the dictionary of root words for each of the stemmed results and if any is found, take the longest one.
(14) Otherwise, take the shortest stem.
(15) If there is a stemming cache in effect, update it with the results.

The various dictionaries required by this logic are either passed to the routine as parameters, or they are passed through the basic stemmer context record described below as set up by the "makeStemmerContext" plug-in call. Note the fact that the input is not internally truncated to a single word until after the three mapping dictionaries (phrases, tense, and irregular plurals) have been applied. This allows for things like thesaurus compaction as well as dealing with the possibility of multi-word plural forms (e.g. "will be" becomes "is"). The 'charsConsumed' result can be used by the caller to determine how many characters have actually been consumed from the input stream (see the description above for the "invokeStemmer" plug-in). This function is completely script and language independent and merely performs dictionary and logical operations as part of the stemming framework, calling registered stemming algorithms as specified by an 'algorithm' list set up by the "makeStemmerContext" plug-in. For these reasons, the function itself is completely multilingual and invariant across all languages. The implementation and operation of the various dictionaries will be discussed later.

The beneficial effects provided by this federated approach to stemming include the following:
(1) The stemming framework can handle irregular plural forms (e.g., "men" and "man").
(2) The stemming framework can handle irregular tense forms (e.g., "teach" and "taught")
(3) The stemming framework can handle phrase mapping (e.g., "when hell freezes over" becomes "never").
(4) The stemming framework handles caching results thereby improving performance of any stemming algorithm regardless of algorithm speed.
(5) The stemming framework chooses the best result from all available stemmers allowing multiple stemming algorithms to be combined for improved results. In Table 1 above, the output from the Porter stemmer was used for the word "abjurdicating" (which in this case is actually a spelling error) since the Fairweather stemmer did not produce a result. This means that even if the dictionaries for the Fairweather stemmer are incomplete, reasonable stemming behavior is still possible by adding another stemming algorithm as a backup that is only invoked when the primary stemming algorithm fails.
(6) The stemming framework handles lookup of words in the existing stemmed inverted index. This is critical in English, for example, when a word starts a sentence and thus begins with an upper case letter. This behavior allows the system to correctly determine that the word is identical to it's lower case variant occurring elsewhere in any preceding sentence and thus avoids stemming errors as a result.
(7) The stemming framework can handle multi-word variants (e.g., "will be" becomes "is").
(8) The stemming framework can implement a "thesaurus" mapping which causes different words with similar meanings to be conflated. This can be used to provide another level of meaning search so that for example a search for "chair" would also return hits for "sofa," "recliner," "stool," etc. Such aggressive conflation may not be desirable in all cases, but in certain applications might provide considerably improved results.
(9) The stemming framework can handle common abbreviations. For example, the sequence "TTYL" appearing in instant messaging exchanges can be mapped to "talk to you later."

The execution time for the function QX_UniversalStemmer( ) is approximately three times that of the Porter algorithm itself. This means that the overhead to obtain this significantly improved performance (even if not using the disclosed stemming algorithm) is small and can have a significant impact on search accuracy.

Before continuing with the description of the stemming framework, it is important to describe how it is integrated with any database subsystem that uses it. There are essentially just two points where stemming must be performed, the first is during the creation of the inverted index file used by the database to search text, and the second is on any text query terms passed as the result of a user query to the database. The logic for the indexing routine of the database would appear as follows:

| IndexTextField | ( | | // Database text indexing function |
|---|---|---|---|
| | ConstCharPtr | language, | // I:Language of field text |
| | ConstCharPtr | aString, | // I:Text of the field |
| | ... | | // I:Other Parameters |
| | | ) | |

```
{
    scannerFn = Obtain "scanWord" plug-in for language
    prepareFn = Obtain "prepareForIndexing" plug-in for language
    stemmerFn = Obtain "invokeStemmer" plug-in for language
    if ( prepareFn )                            // insert proper name
                                                protection
        buff = (prepareFn)(text,...,language)   // blocks as appropriate
    for ( all text in buff ) loop               // now eliminate
                                                punctuation etc.
    {                                           // which cannot be indexed
        tok = (scannerFn)(...)                  // obtain the next token
        if ( tok != word or number )            // if not indexable,
                                                remove...
            replace token string in buff by spaces
    }
    if ( stemmerFn )
        (stemmerFn)(buff,...,options,language)
    remove all proper name protection blocks inserted by 'prepareFn'
    from buff
    for ( every word in buff ) loop
    {
        index the word into the inverted file - database specific
    }
}
```

The logic for processing the word sequence specified in a user query is essentially identical except that the final indexing loop is not required but instead the stemmed query text is passed to the inverted file lookup engine. Other than ensuring that the "makeStemmerContext" and "killStemmerContext" plug-ins are called for every supported language during database startup and shutdown respectively, this is all that it takes to add the disclosed stemming framework and stemming algorithm to an existing text search engine or database.

Looking now at the "prepareForIndexing" plug-in function (which is optional for any given language), the purpose of this function is essentially twofold:

(1) In the case of Latin languages where there is an upper and lower case variant of each letter in the alphabet, this function must convert text to be stemmed to lower case while ensuring that proper names and the like remain in upper case. This does not apply to many other script systems.

(2) This function should ensure that proper names of people, places, etc. are protected from the stemming algorithm if that stemming algorithm is based on existing stemming technology. The stemmer disclosed herein, being essentially dictionary based, tends not to attempt stems on proper names unless those proper names are also words in the language itself.

To do this, the "prepareForIndexing" function generally uses lookup dictionaries, implemented identically to all other dictionaries discussed herein, to recognize names and acronyms. It then modifies the source text to place protective delimiters around words that should not be stemmed while converting those that should to the appropriate case (where applicable). One complication in Latin languages is that certain older text sources may be all upper case such as text in a teletype message and if text from these sources is to be merged with text from other sources, it must be correctly converted to mixed case. The "prepareForIndexing" function may vary from one language to another. In the case of the Roman script, the stemmer assumes its input is in lower case and requires that the text stream coming in has had certain basic rules applied to it to determine if the universal stemmer should even be called. In these cases, the "prepareForIndexing" plug-in (which implements this logic) performs the following basic logic:

(1) If the word starts with a capital letter:
  (a) If the word is all capitals (and more than one letter):
    (i) Look it up in the acronyms dictionary (if present) and if found don't stem.
    (ii) Convert to all lower case.
    (iii) If word is in stop words dictionary, done.
    (iv) If word already exists in the stemmed inverted file, done.
    (v) If upper-case word exists in the stemmed inverted file, don't stem, use upper case word.
    (vi) Convert first letter of word to upper case.
    (vii) If word is in surnames, male names, or female names dictionaries (if present), don't stem, use the mixed case word.
    (viii) If word already exists in the stemmed inverted file, don't stem, use the mixed case word.
    (ix) Convert following words to first letter upper case (unless they are >one letter long and are in the stop words dictionary).
    (x) Look up the word(s) in the places dictionary (if present), if found use the mixed case word(s) and don't stem.
    (xi) If the preceding word (if available) was all upper case or the following word (if available) is more than one letter and starts with an upper case letter, copy the lower case word over and stem.
    (xii) Otherwise use the original word (case unchanged) and don't stem.
  (b) Otherwise:
    (i) If the word starts a sentence (or quotation):
      (1) Convert first letter to lower case.
      (2) If word is in stop words dictionary, or follows a single quote and is "s" (possessive) done.
      (3) If word exists in the stemmed inverted file, done.
      (4) Convert first letter back to upper case.
      (5) If word is in surnames, male names, or female names dictionaries (if present), don't stem, use the mixed case word.
      (6) If word is in the places dictionary (if present), use the mixed case word(s) and don't stem.
      (7) Look it up in the acronyms dictionary (if present) and if found don't stem.
      (8) Otherwise, convert to lower case and stem.
    (ii) Otherwise it must be a proper name or acronym, don't change case, don't stem.
(2) Copy the word over unchanged and stem.

The result of the logic above is that words are almost always presented to the stemmer in the correct case and therefore conflate correctly. When a word is identified that is a proper name of some sort, or which should be protected from subsequent stemming, it must be surrounded by protective delimiters in the text as follows:

<[>—Delimiter to start an un-typed proper name sequence
<]>—Delimiter to end a protected proper name sequence
<[>=TypeName:—Delimiter to start a typed proper name sequence So for example, the sequence "<[>=Person:John Smith<]>" causes the words "John Smith" to be protected from stemming, but also identifies it as a possible name for a person. Other examples of typed entity recognizers and protection might be "<[>=Organization:Microsoft<]>" or "<[>=Place:London<]>." The stemming algorithm itself ignores these type flags since they are recognized by the "scanWord" function, and are thus not considered to be stemmable words (see below for details). The enclosing database system may choose to use this type information from the "prepareForIndexing" call in order to aid in entity recognition. The type of the identified object is known to the plug-in by virtue of which dictionary it was found in, and optionally by typed name lookup in the database. The basic stemmer context utilized by the stemming framework contains support for specifying male names, female names, surnames, place names, acronyms, stop words (which are small connecting words common in most languages but which have no value in searches, e.g., "a," "an,", "the," etc.) and similar dictionaries, and as a result of where a given word(s) was found in these dictionaries, generates the appropriate protective delimiter block. After the database system has performed the call to "invokeStemmer," it is a simple matter to strip off these delimiting blocks in order to restore the text to a state where un-protected words have been stemmed, and protected words have not, but the text is otherwise unchanged including all punctuation. As a result the text sequence "John Smith was sitting on the mat" once passed through the stemming sequence would appear as "John Smith sit mat," in other words the effect of stemming is to remove all subtleties from the language, reducing it to a sort of cave-man version, while ensuring that the all important proper names are not modified (since these are some of the most important words that will be searched on later).

Throughout the discussion above, the use of dictionary lookup has been referred to, and before continuing with the description of the stemming framework and stemming algorithm, a description of the unique implementation of these extremely fast dictionaries is required. These dictionaries are based on the lexical analyzer technology described by this applicant in pending U.S. patent application Ser. No. 10/357, 326 titled "Method for Analyzing Data and Performing Lexical Analysis" filed on Feb. 3, 2003, as combined with the "string list" functionality provided by the flat memory model described by this applicant in U.S. Pat. No. 7,103,749 titled "System and Method For Managing Memory" issued on Sep. 5, 2006, both of which are herein incorporated by reference for all that is taught and disclosed therein. Although the descriptions below will be given in terms of the technology described in these references, one skilled in the art will recognize that an alternate dictionary method could be used that would provide the necessary features, particularly for retrieving mappings, and it would be obvious to attempt to implement these dictionaries through any number of other means, especially if stemming performance (in terms of execution time) were not considered a priority.

A dictionary, as defined in this context, comes in two basic variants. The first is simply a lookup dictionary in order to determine if a particular word is a member of a set. Examples of this kind of dictionary are the "male," "female," "surname," and similar dictionaries, where simply knowing that the word is in the dictionary is the only information needed. This kind of dictionary will be referred to henceforth as a "lookup" dictionary, and can be implemented purely using the dynamic lexical analyzer as described below. The second type of dictionary will be referred to as a "mapping" dictionary in which a word is first looked up (using a lexical analyzer as for the "lookup" variant), but for which the token returned by the lookup serves as an index into a second 'array' of strings, where the array element contains one or more alternate words to be output to the text stream in place of the word(s) used to lookup. Examples of "mapping" dictionaries in the discussions above are the "phrase," "plurals," "tense," and "fix-up" dictionaries used by QX_UniversalStemmer( ) to map irregular word forms to output words that will conflate or can be stemmed normally. The root word mapping dictionary used by QX_MapRootsToEnglish( ) to map foreign language root words to the English equivalent is another example of such a mapping dictionary. Mapping dictionaries are implemented in the preferred embodiment by lookup using the lexical analyzer followed by access into a string list implemented using the flat memory model to obtain the mapped output.

Both types of dictionary are extremely fast for lookup because the lexical analyzer described in the reference patent is table driven, memory resident, and yields a search time proportional to the logarithm (base 26) of the number of entries in the dictionary, and hence does not increase significantly even for dictionaries containing millions of entries. While other schemes exist in the current art for rapidly obtaining an index to a table given a token string, all are based on some kind of hashing function that converts the string to a number which can then be used to find the table entry required. In the stemming application however, it is essential to not only be able to find the required table entry as fast as possible, but to also be able to examine possible fallback table entries that correspond to shorter tokens without making multiple lookup calls. Only a table-driven lexical analyzer state transition approach to dictionary lookup is capable of this kind of re-trace. The reason for this requirement will become clear below in the discussion of the stemming algorithm disclosed herein. Essentially, because the disclosed stemming algorithm uses a shortest path approach, it must be able to examine all possible paths through a word including paths corresponding to shorter tokens without excessive dictionary lookup. Hashing approaches do not support this capability since the hash bucket for a longer string does not yield information on shorter strings that are also allowed. Another aspect of the referenced lexical analyzer is the ease with which the lexical analyzer tables can be dynamically updated without any need for recompilation, and this in turn makes it very easy to update any and all dictionaries associated with the stemming process and test the resultant change without any need to re-run the application. This feature enables the implementation of the User Interface ("UI") necessary to allow non-technical users to fill out the dictionaries required by the disclosed stemming algorithm, as well as the other dictionaries described above. In the case of a "lookup" dictionary, the token returned as a result of dictionary lookup is simply an index corresponding to the word given. In the case of a "mapping" dictionary, the unique ability of this lexical analyzer to return any specified token as a result of recognition is used to obtain a token corresponding to the offset within the flat (i.e., single memory allocation) string list at which the entry for the word(s) concerned begins, which once again results in just a single operation in order to perform the mapping. It is the combination of these two technologies that allows the stemming framework and stemming algorithm disclosed herein to have execution times comparable with the much simpler classical stemming algorithms, despite the complexity of the operations being performed. Examining now the structure of the basic stemmer context record alluded to above, it is essentially comprised mostly of "lookup" (ET_LexHdl) and "mapping" (ET_Dictionary) dictionary references as follows:

```
typedef struct ET_BasicStemCont
{
    // Lookup dictionaries:
    ET_LexHdl           wordScanner;
    ET_LexHdl           stopWordsH;
    ET_LexHdl           surnamesH;
    ET_LexHdl           femaleH;
    ET_LexHdl           maleH;
    ET_LexHdl           acronymsH;
    ET_LexHdl           placesH;
```

-continued

```
ET_LexHdl                rootsH;
// Mapping dictionaries:
ET_Dictionary            fRoots;
ET_Dictionary            fPrefix;
ET_Dictionary            fSuffix;
ET_Dictionary            fInfix;
ET_Dictionary            rootMapping;
// Other fields
QX_StemAlgorithmSpec     algorithms[kMaxStemmingAlgorithms];
int32                    numAlgorithms;
ET_StemmerCostCalcFunc   fCostCalc;
...
int32                    bytesPerChar;
int32                    specialOptions[ ];
ET_DictLineScannerFn     aDictLineScanner;
} ET_BasicStemCont, *ET_BasicStemContPtr;
```

These fields in the basic stemmer context reference the various dictionaries discussed above, and they are all loaded initially by calling the routine QX_InitBasicStemContext( ) which is called within every language specific "makeStemmerContext" plug-in during initialization. This function takes the language name as a parameter and uses it to locate a directory within which the files corresponding to the various dictionaries are located, and for every file that is found in the language directory, the function loads the appropriate dictionary structures into memory and then places a reference to them into the stemmer context record. The 'specialOptions' parameters allow the "makeStemmerContext" plug-in to customize the various options to be used when loading each distinct dictionary by use of the following basic options:

(1) kFirstWordRecognizer—For a "mapping," lexical analyzer should recognize the first words, not the following words.
(2) kNoTerminator—No terminator required. The lexical analyzer should not require a following delimiter character to recognize a token in the dictionary. This behavior is important to the stemming algorithm disclosed herein.
(3) kFlipCharOrder—Flips the order of characters as they are added to the dictionary (for easy suffix recognition).
(4) kNormalizeUTF8Dictionary—Normalize the UTF-8 read from the dictionary text file on input.

The 'algorithms' array and the 'numAlgorithms' field are set up by the "makeStemmerContext" function to reference any additional stemming algorithms available for the language. If left unchanged, only the disclosed stemming algorithm will be used. The function of the 'aDictLineScanner' reference relates to processing that may have to be performed when loading dictionaries but will not be described herein. An example of the use of this function is in mapping Hangul character in Korean which have different encodings depending on their position in the word. The 'fCostCalc' field is normally left un-changed but may be used to alter the cost calculations in the disclosed stemming algorithm (see below for details). The stemming framework requires that the first field of any language-specific stemmer context record start with a field called "basic" of type 'ET_BasicStemCont' so that the stemming framework can access all the dictionaries and values it requires once initialization is complete. Particular languages may require additional dictionaries or other context information, and this is set up by the "makeStemmerContext" plug-in and referenced by the language-specific fields of the stemmer context that follow "basic." It is any storage that is referenced in this extended context record that must be disposed on the "killStemmerContext" plug-in call. Otherwise, this call consists of nothing more than a call to QX_KillBasicStemContext( ) which simply disposes of all structures allocated by QX_InitBasicStemContext( ).

The only remaining component of the generalized stemming framework needing description is the "scanWord" plug-in. As mentioned above, in most cases this is no more than a call to the lexical analyzer LX_Lex( ) described in the referenced pending patent application using the recognizer table referenced by the 'wordScanner' field of the basic context described above (which is set up in the "makeStemmerContext" plug-in for the language to recognize all token types required by the stemming framework). These are described in Table 4 below.

TABLE 4

| Token Number | Meaning |
| --- | --- |
| Negative number | Error occurred in character sequence |
| Zero | Failed to recognize any special token |
| 1 | Identifier, i.e., a word in the language |
| 2 | Number, a numeric value |
| 3 | A delimited proper name sequence |
| 64 | A sentence terminator (i.e., a period character in English) |
| 65 | The start of a paragraph (i.e., new line followed by tab) |
| 66 | A double quote character |
| 67 | A single quote character |

In all cases, the "wordScanner" returns via a reference parameter, the number or characters consumed in the input stream in order to recognize (or not recognize) the token involved. The tokens from 64 and above are not actually required as part of the stemming framework, but are intended to allow any database system that is using the stemming framework to determine the start and end of sentences and paragraphs so that it may optionally support query based on words being in the same sentence or paragraph. Looking back to the description of the IndexTextField( ) for the calling database, it is seen that if the token returned by the word scanner is anything other than 1, 2, or 3, the extracted characters are eliminated from the stemming stream. If the token returned is 3, meaning that the text involved should be protected from stemming, the sequence will be passed to the "invokeStemmer" plug-in but since it starts with the "<[>" protective delimiter, the stemmer will return without making any change. The main purpose therefore of the "wordScanner" plug-in is to specify to the lexical analyzer the range of characters that should be considered valid for words and numbers in the language. To illustrate this, the state transition diagram shown in FIG. 1 shows the complete lexical analyzer table specification for the "wordScanner" of the Korean stemmer implemented using the disclosed stemming algorithm.

FIG. 1 shows the lexical analyzer state transition diagram necessary to implement the "scanWord" plug-in required by the stemming framework for the Korean language. Referring now to FIG. 1, the only aspects of the language specific scanner for Korean that are additional/different to that used for English, are the transitions labeled "0xE18480-0xE187B9" which correspond simply to the Hangul character codes for the normalized UTF-8 characters that make up the Korean script. This recognizer will therefore also function for mixed language text, which is quite commonplace. For other script systems, this character range would be different, and there might be additional transitions (for example Arabic numerals are different from the characters 0-9). In FIG. 1, the states that do not have numeric values are non-accepting states, and the occurrence of any character other than those listed in transitions leaving the state will result in the recognizer returning a negative value to indicate that a correct token was not recognized. For the numbered or accepting states, the occurrence of any character not listed in transitions leaving the state causes the recognizer to stop and return the token corresponding to the accepting state.

A unique feature or requirement of the lexical analyzer implied by the state transition diagram in FIG. 1 is that it must be able to recognize character sequences of variable size as if they formed a single larger integer value as implied by the hex number range "0xE18480-0xE187B9." Recognizing this range would require the recognizer to accumulate three successive bytes from the input stream and then make a range comparison on the accumulated integer value, whereas all other transitions in the diagram require only a single character comparison in UTF-8. This ability to simultaneously handle variable sized character comparisons within a single diagram is a unique feature of the lexical analyzer described in the referenced pending patent application, and is essential in any system that wishes to efficiently process UTF-8 text in its native form rather than converting to a sequence of ASCII characters before performing the stemming process (as is commonplace in existing stemmers for non-Latin script systems). This ability is another aspect of ensuring maximum performance of the stemming process.

The result of the stemming architecture above, when utilized by any database system, is to transparently allow that system to handle multilingual text in a consistent and integrated manner without the database system itself having to be significantly altered to do so. Moreover, given the root mapping capability, such a database automatically gains the ability to search across all supported languages in a consistent manner, thus allowing multilingual search regardless of the language of the original query. Most significantly perhaps, because all calls to the plug-ins described above are conditional on the fact that the plug-in has actually been specified for the language concerned, it is possible to immediately deploy a system that can handle all languages simply by ensuring that the necessary "scanWord" plug-ins are available (which is relatively trivial), even if no dictionaries or stemming algorithm is yet specified for some languages. The result is that searches in those languages are un-stemmed but still possible. This means that such a system can be continuously upgraded without any need to change the code or executable, simply by adding more refined dictionaries as they become available and re-indexing any data for the language concerned. This ability to upgrade database behavior and accuracy without any subsequent need to install a new version is highly desirable for any commercially deployed system, and is unique to the stemming framework and stemming algorithm disclosed herein. Indeed, since it is possible for the user organization to refine dictionaries at any time, this ability allows user organizations to deploy specialized dictionaries in order to improve search operation in specialized domains (e.g., medical, law, science, etc.) without requiring any action on the part of the database provider. This flexibility could represent a crucial discriminating factor for any commercial database or search vendor.

Stemming Algorithm

Now that the stemming framework itself and how it is integrated with any existing database has been described, it is possible to now describe the shortest-path based stemming algorithm in isolation from any surrounding context. As discussed above, the disclosed stemming algorithm is based on the premise that in essentially all languages, it is possible to construct all word variations from the following basic pattern:

[Prefix] Root {[Infix] Root} [Suffix]

The stemming algorithm requires an extremely fast lexical analyzer lookup in order to allow it to recognize all the various word portions above. In the previous description of the basic stemmer context structure, the fields 'fRoots,' 'fPrefix,' 'fSuffix,' and 'fInfix' represent the various recognizers required by the lexical analyzer LX_Lex( ) in order to recognize all allowed string fragments that make up any of the legal values for the root, prefix, suffix, and infix sequences in the language concerned. These dictionaries are loaded automatically during initialization (within "makeStemmerContext") by the stemming framework if the corresponding files are present in the directory for the language concerned. Given these dictionaries, the stemming algorithm disclosed herein comprises a main routine and a recursive subroutine, where the main routine essentially handles exploring all possible combinations of prefix and suffix (including of course no prefix and no suffix), while the recursive inner subroutine is responsible for exploring all sequences of root(s) and infix portions that could make up the central portion of the word being stemmed. The inner subroutine must be recursive in order to handle arbitrary numbers of roots within a word as implied by the phrase "Root {[Infix] Root}."

The main/outer function of the stemmer QX_FairweatherStem( ) contains the following logic:

```
Boolean QX_FairweatherStem
    (                                        // Fairweather Stemmer
    QX_BasicStemContPtr    scP,              // I:Language basic stemmer
                                                context
    charPtr                word              // IO:input word/stemmed output
    )                                        // R:true if stemmed, false if not
{
    int32    prefix[ ],suffix[ ],prefixWords[ ],suffixWords[ ];
    if ( scP->fPrefix set up)
    {
        call LX_LexInternal(,word,&nP,&prefix[ ],&prefixWords,...)
        if ( nP > 1 )                        // nP is number of prefixes
            sort prefix[ ] and prefixWords[ ] by increasing length
    }                                        // set up the no prefix element
    prefix[nP] = prefixWords[nP] = 0;
    if ( scP->fSuffix set up)
    {
        flipped = flip the character order in word
        call LX_LexInternal(,flipped,&nS,&suffix[ ],&suffixWords,...)
        if ( nS > 1 )                        // nS is number of suffixes
            sort suffix[ ] and suffixWords[ ] by increasing length
    }
    suffix[nS] = suffixWords[nS] = 0         // set up the no suffix element
    bustOut = NO
    max = strlen(word)
    minCost = max 32-bit integer value
    for ( i = nP; i >= 0 && !bustOut; i-- )
    {
        n = prefix[i];
        pCost = (scP->fCostCalc)(kStemActionPrefix,n,...)    // get prefix cost
        for ( j = nS ; j >= 0 && !bustOut; j-- )
        {
            m = suffix[j]
            sCost = (scP->fCostCalc)(kStemActionSuffix,m,...)  // get suffix cost
            if ( QX_iFairweatherStem(scP,&rCost,word,rWord,&ts,...) )
            {                                // inner routine succeeded...
                xCost = rCost + sCost + pCost
                if ( ts+m+n == max && xCost < minCost )
                {                            // completed word, lower total
                                                cost...
                    if( !n && !m)            // recognized a naked root word
                        bustOut = YES        // so we're done!
                    minCost = xCost          // new minimum cost
                    pWord[0] = sWord[0] = '\0'
                    if ( prefixWords[i] )
                        pWord = mapped word(s) from scP->fPrefix
                    if ( suffixWords[j] )
                        sWord = mapped word(s) from scP->fSuffix
                    cp = &word[0]            // copy stemmer results back to
                                                word[ ]
                    if ( pWord[0] && pWord[0] != '+' )
```

```
            cp += copy pWord + space to cp
            if ( sWord[0] && sWord[0] != '+' )
                cp += copy sWord + space to cp
            cp += copy rWord to cp
            if ( pWord[0] == '+' )
                cp += copy space + pWord to cp
            if ( sWord[0] == '+' )
                cp += copy space + sWord to cp
          }
        }
      }
    }
}
```

The function LX_LexInternal( ) used above to recognize prefix and suffix strings is identical to the standard function LX_Lex( ) described in the referenced pending patent application, but includes three additional parameters which allow it to return the number of accepting states (including the final state) along the transition path that lead to token recognition (assigned to nP or nS above), and two arrays, used to hold the lengths of the string for each accepting state (prefix[ ] and suffix[ ] in the listing above), and a second array used to hold the token corresponding to each accepting state along the path (prefixWords[ ] and suffixWords[ ] in the listing above). What this means is that with a single call to LX_LexInternal( ), the stemming algorithm can enumerate all possible prefixes or suffixes for the word concerned. For example, consider an English word ending in the suffix "alities" (e.g., realities). The one call to LX_LexInternal( ) returns a suffix count of five and sets up the suffix[ ] and suffixWords[ ] arrays as appropriate for the suffixes "alities," "ities," "ies," "es," and "s" each of which must be explored as a possible jumping off point for finding paths through the complete word. The same is true of prefixes as illustrated by the listing. To explore all possible paths, the routine must obtain all possible suffix and prefix starting points, and then perform a nested loop over all combinations, and LX_LexInternal( ) supports this via a single call for the prefixes and another for the suffixes. To implement this behavior using a standard hash-based dictionary lookup would be very time consuming and complicated.

As can be seen from the listing, if there is more than one prefix or suffix involved, the stemming algorithm sorts them by increasing order and then appends the no prefix and no suffix case to the end of this sorted list. The loops then start from the no prefix/suffix case and then proceeds backwards from the longest prefix/suffix to shorter prefixes and suffixes. This strange ordering is chosen for a number of important reasons:

(1) By starting with the no prefix, no suffix case, the common case of recognizing a word that is already a complete root word (i.e., has no prefix or suffix) is examined first, and if found, the loops are immediately terminated (bustOut set to true) thus ensuring that this common case results in minimal execution time.

(2) Sometimes as a result of the vagaries of the cost curves discussed below, a situation arises where the minimum cost path through a word does not result in the correct stem, and this cannot be fixed by any other means than adding a longer root word fragment mapped to the same root output to cause a new lower cost path. The fact that the no affix (i.e., no suffix and prefix) case occurs first allows this technique to be used in the final resort to solve any otherwise unsolvable problem with cost calculations, since as can be seen, the routine will stop immediately if it recognizes a naked root word.

(3) After the no suffix/prefix case, the fact that the loop then continues in decreasing order of affix size is taken advantage of by the inner recursive function in order to differentially favor longer trailing roots in the word over longer suffixes, and this logic significantly reduces the amount of dictionary tweaking necessary to overcome suffix/trailing root ambiguities.

When constructing the list of suffixes for any given word, the function first inverts the order of the characters in the word, and then once again uses LX_LexInternal( ) to obtain a set of suffixes. It was noted earlier that the custom option 'kFlipCharOrder' when passed to the dictionary load routine causes it to construct a recognizer for the dictionary entries with the character order swapped. Since this option is always specified when suffix dictionaries are loaded, the recognizer is already set up to recognize the suffixes that start the flipped word to be stemmed, and thus the stemming algorithm avoids a great deal of time and complexity that would otherwise be required in order to obtain a list of all potential suffixes.

It can be seen from the listing that the stemming algorithm obtains a cost measure for both the prefix and suffix by calling the cost calculator function set up in the basic context field 'fCostCalc' and passing it the word part involved, the number of characters involved, and the average number of bytes per character for the language (set up by the "makeStemmerContext" call in the basic context field 'bytesPerChar' which is 1 by default). Thus far, and somewhat surprisingly, applicant has discovered that a single default cost calculator function appears to work correctly for all languages, regardless of script system. The code for this function is as follows:

```
int CostCalcFunc (                        // Default cost calculator
       short              action,         // I:word part involved
       int                n,              // I:Number of characters
       int                m               // I:Average bytes/character
                    )
{
    cost = n;
    n /= m;
    switch ( action )
    {
        case kStemActionRoot:
            cost = 2 * n – n/2 + 1
        case kStemActionPrefix:
            cost = 2 * n + 1
        case kStemActionSuffix:
            cost = 2 * n – 2
        case kStemActionInfix:
            cost = 2 * n + 2
    }
    return cost;
}
```

Figure 2:
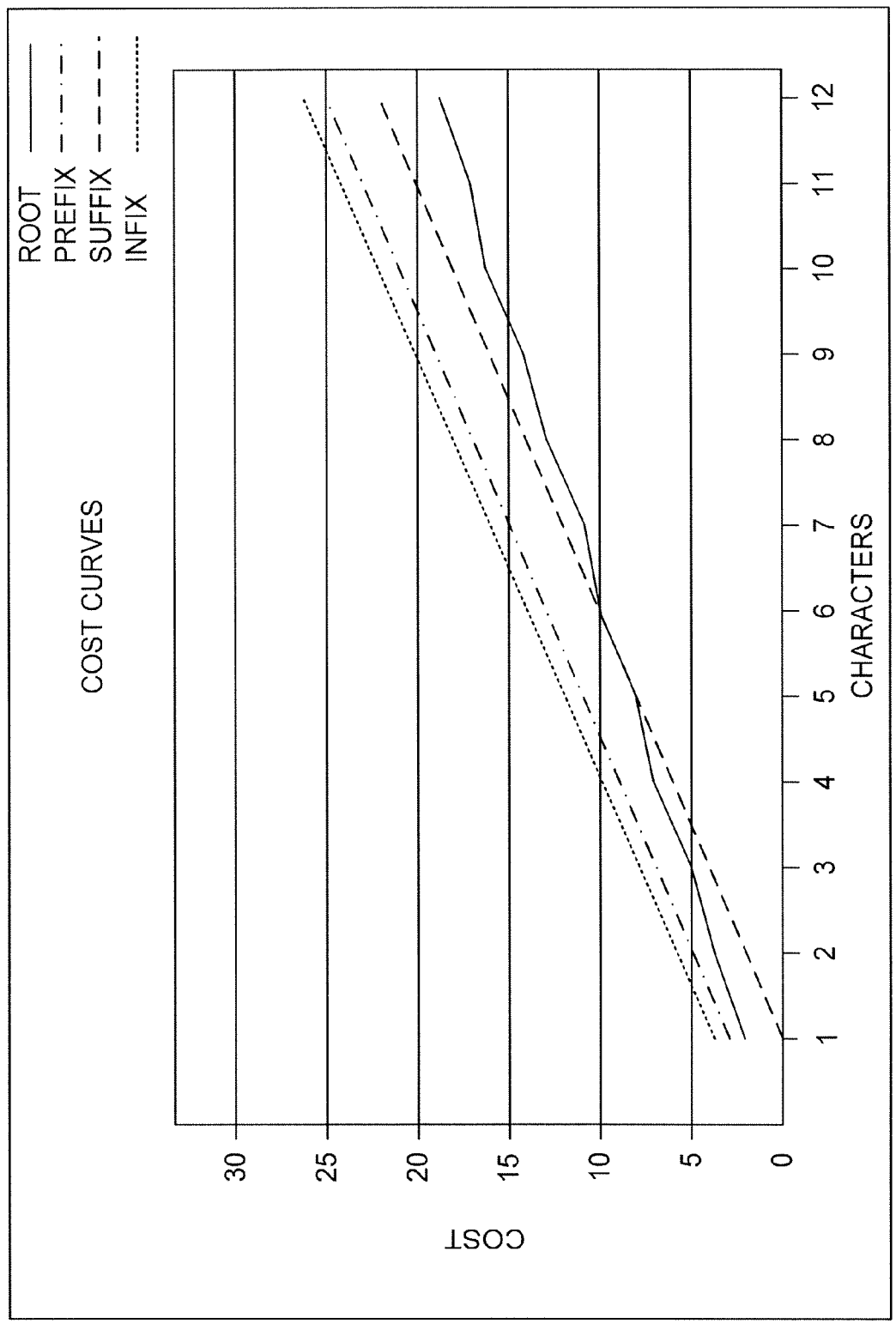
FIG. 2 shows the default cost curves for the various word components used by the disclosed stemming algorithm.

The stemming framework allows alternate cost calculator functions to be registered for any given language but in practice, given the choice of cost curves shown in FIG. 2, this has thus far proved unnecessary.

FIG. 2 shows the default cost curves for the various word components used by the disclosed stemming algorithm. Referring now to FIG. 2, if the cost curve for each word part is plotted against the normalized number of characters involved (i.e., divided by the average number of UTF-8 bytes per character in the language) the result is the graph depicted in FIG. 2. Cost on the y axis is simply an arbitrary number that can be thought of as the length of the path segment in a traveling salesman problem. The length of each segment on the path through a word is its cost, which is computed by the cost calculator function described above. A number of significant points can be observed that are crucial in order to minimize the number of special cases that must be explicitly handled in the dictionaries, thereby minimizing dictionary size and reducing the amount of work necessary to get correct results in all cases. The first point is that at the low end of the characters axis, the cost of suffixes is significantly less than that of roots, whereas as the root fragments become longer they become significantly cheaper than the corresponding suffix. This behavior serves two main purposes. The first is that the stemming algorithm tends to favor small suffixes at the end of a word rather than finding a path by stringing together multiple roots. As an example, consider the English word "contraction" which can be parsed either as two roots as in "contract" and "ion" for a cost of 20, or as a single root "contract" followed by the suffix "ion" for a cost of 17. This behavior causes the ambiguity between small trailing root words like "ion" and suffixes to be resolved in favor of the suffix in most cases, and it turns out that this is normally the appropriate behavior. As the length of the suffix increases however, this behavior becomes inappropriate, since long suffixes might cause significant trailing roots to be lost. An example of this is the English word "rationalistically" which can be parsed in two ways: as the root "ration" followed by the suffix "alistically" (cost 30); or, the root "rational" followed by the suffix "istically" (cost 29). The increased cost associated with the long suffix "alistically" is what causes the longer root "rational" to be chosen over the shorter root "ration."

It can be seen that there is a grey area in the curves for root and suffix sizes of five or six characters, and it is this grey area that is the reason why the stemming algorithm proceeds from the longest suffix to the shortest, since this allows the inner recursive loop to detect a situation where the costs are identical and choose in favor of the longer root when this occurs (as described below). Because the longer root will be examined after the shorter one, the stemming algorithm has all the information necessary to make the right choice. The higher cost of prefix fragments over roots ensures that prefix sequences are only chosen over alternate root fragments when appropriate. The various words beginning with "ab" in Table 1 show examples of this behavior. The fact that infix sequences are far more expensive than any other component is designed to prevent the possibility of multi-root words being chosen over longer roots as a result of being split by small one or two letter infix sequences. The "plus 1" term for root words is also critical in ensuring that any word that can be interpreted either as two adjacent roots or as a single longer root is resolved in favor of the longer root. An example in English might be the word "beestings" which has nothing to do with bees or their stings, but is another word for colostrum. In addition, as discussed below, the inner recursive routine keeps track of its recursion depth which corresponds to the number of roots that have been chained together in the path, and it also adds this depth value to the cost for any root word fragments. This results in paths constructed by chaining multiple small roots becoming progressively more expensive as the number of roots increases which again has the beneficial effect of further favoring longer roots. As mentioned above, experience has shown that these curves appear to work quite well regardless of language. However, the stemming framework allows alternate cost curves to be substituted for any language if the defaults do not result in easy dictionary management.

Looking at the listing for QX_FairweatherStem( ) again, the only other aspect of the outer portion of the stemming algorithm that still needs to be explained is it's behavior in copying the results of the stemming process back to the stemmed output buffer. The inner recursive portion of the stemming algorithm QX_iFairweatherStem( ) returns the result of the inner parse in the buffer rWord which may contain one or more words as a result of root word mapping. Since both prefix and suffix fragments can optionally be mapped to an output word, the outer routine must assemble a sequence of words in the right order to represent the extracted meaning. This behavior of outputting multiple words in response to stemming is unique to the stemming algorithm disclosed herein and improves search results since without it prefix stripping (at least in English) becomes impossible, and the dictionaries must be much larger and also less expressive. Examples of the need for this are shown in Table 1 where the words "abnormally" and "abaxial" are broken into two output words with a leading "not" that is generated as a result of prefix mapping. In English, if the stemmer failed to do this, and the search was for the word "normal," then no hits would be returned for documents containing the word "abnormal" even though this is incorrect behavior. Note however that in the disclosed stemmer algorithm, this is not the case and also that searches for "abnormal" will return not only hits containing words derived from "abnormal" but more importantly, if the author chose to say "not normal" instead of "abnormal," these documents will also be returned as a result of stemming on the query terms. The mapped fragments for the prefix and suffix if relevant (suffixes in English rarely result in a mapping whereas prefixes usually do, but the situation is different in other languages), are fetched from the appropriate dictionaries and pre-pended by default to the output text. Note however that the stemming algorithm allows the dictionary entry to start with a "+" character and this instead results in appending the word after the word(s) resulting from root mapping. In other languages, due to the differing ordering or words, it is often more correct to append rather than prepend affix mappings, and this is fully supported by the stemming algorithm. The multi-root words in Table 1 such as "abdominothoracic" and "andominoanterior" are also examples of how existing stemming approaches fail to provide accurate search results, since if the search was on the word "abdomen," neither of these words would result in hits in a classic stemming system. Similarly a search on "thorax" would fail to return documents containing the word "abdominothoracic." In certain specialized fields such as medicine or chemistry, where words are commonly constructed from multiple significant roots (the word divinylbenzene in Table 2 is an example) this shortcoming in current text search systems can be critical, and hence the disclosed stemming algorithm can provide considerable benefit.

The following listing shows the implementation of the inner recursive routine of the stemming algorithm QX_iFairweatherStem( ):

```
Boolean QX_iFairweatherStem                              // Fairweather
        (                                                   Stemmer
        QX_BasicStemContPtr    scP,                       // I:Language basic
                                                              stemmer context
        int32Ptr               costP,                    // O:Cost for sequence
                                                              returned
        charPtr                word,                     // I:input word
        charPtr                outWord,                  // O:Output word(s)
        int32                  depth,                    // I:Recursion depth
        int32Ptr               charsConsumed,            // O:# of chars
                                                              consumed
        ...                                               // Other parameters
        )                                                 // R:true for success,
                                                              false otherwise
```

```
{
    char     infix[ ],infixWords[ ],roots[ ],rootWords[ ];
    cp = &word[0]
    max = strlen(cp)
    if ( depth > 0 && scP->fInfix set up)
    {
        call LX_LexInternal(,word,&nI,&infix[ ],&infixWords,...)
        infix[nI] = infixWords[nI] = 0;              // set up the no infix
                                                     element
        minCost = max 32-bit integer value
        for ( i = nI; i >= 0 ; i-- )
        {
            n = infix[i]
            iCost = (scP->fCostCalc)(kStemActionInfix,n,...)
            cp = &word[n]
            tok = LX_LexInternal(fRoots,&ts,&nR,&roots[ ],&rootWords[ ],)
            if ( tok > 0)
            {
                if ( ts + n < max )                  // more text after the
                                                     root so recurse
                {
                    rCost = (scP->fCostCalc)(kStemActionRoot,ts,...)
                    rCost += depth                   // discourage multiple
                                                     roots!
                    if ( QX_iFariweatherStem(scP,&tCost,cp,,depth+1,...) )
                    {
                        if ( rCost + tCost + iCost < minCost )
                        {
                            minCost = rCost + tCost + iCost;
                            if ( infix was mapped )
                                append mapped infix to outWord
                            if ( root was mapped )
                                append mapped root to outWord
                            else
                                append root word fragment to outWord
                            *charsConsumed = max
                        }
                    }
                } else                               // this root reaches
                                                     end of text
                {
                    rCost = (scP->fCostCalc)(kStemActionRoot,ts,...)
                    rCost += depth                   // discourage multiple
                                                     roots!
                    if (this is a longer trailing root)  // favor longer
                                                         trailing roots
                        rCost = 1 less than previous cost
                    if ( rCost + iCost < minCost )
                    {
                        minCost = rCost + iCost;
                        copy [mapped] root to outWord
                    }
                }
            }
        }
        if ( minCost != max 32-bit integer value )
            *costP += minCost
    } else                                           // single root makes up
                                                     word
    {                                                // or first compulsory
                                                     root
        tok = LX_LexInternal(fRoots,&ts,&nR,&roots[ ],&rootWords[ ],)
        if ( tok > 0 )
        {
            if ( ts < max )                          // more text to be
                                                     consumed...
            {
                rCost = (scP->fCostCalc)(kStemActionRoot,ts,...) + depth
                if( !QX_iFairweatherStem(scP,...,depth+1,...) )
                    return NO;
                *costP += rCost;
                copy [mapped] root over to outWord
                *charsConsumed = max;
            } else
            {
                rCost = (scP->fCostCalc)(kStemActionRoot,ts,...) + depth
                if (this is a longer trailing root) // favor longer trailing roots
                    rCost = 1 less than previous cost
                *costP += rCost;
                copy [mapped] root over to outWord
                *charsConsumed = max;
            }
        }
    }
}
```

The inner recursive routine has two sections. The upper section handles recursive calls looking for the sequence "{[infix] Root}" while the lower section handles the initial "Root" term which cannot be preceded by an infix sequence. Obtaining a list of all possible infix sequences is handled in the same manner as obtaining a list of prefixes in the outer portion of the stemming algorithm, but uses the 'fInfix' dictionary and given this list, the routine loops over all possible infixes, computing the infix cost and then calling LX_LexInternal( ) to recognize any trailing root. If a trailing root is found there are two possible conditions, either that root contains enough characters to complete the path, or it does not, in which case the routine must call itself recursively to look for another "[infix] Root" path to complete the parse 45 of the remaining characters. As with the outer routine, the infix and root costs are compared with the minimum cost found so far in order to determine if a new lower cost path through the inner text has been found, and if so, the mapped output for this path is copied to the output buffer 'outWord.' Note that the routine adds the recursion depth 'depth' to the cost for any root found, and, as discussed previously, this logic is intended to favor finding longer roots over sequences of smaller roots. In the case where the current root is the last root required to complete the parse, the routine contains logic to determine if this root is longer than any previously found trailing root, and if so, to alter the root cost in order to cause the resulting path to be one cheaper than the previous path with the shorter trailing root. As discussed previously, this logic is intended to favor longer trailing roots over longer suffixes.

Stemmer Development Environment

The discussions above have presented the details of the actual stemming framework and stemming algorithm, the only remaining issue is to describe the user interface provided to allow easy stemming development by non-technical persons simply by dictionary refinement. One skilled in the art will recognize that a number of UI metaphors are possible, and the descriptions that follow describe the UI of simply an exemplary embodiment. Screen shots of a resizable stemmer development window are provided which appear as shown in FIGS. 3-6 and show the window being used in English, Korean, and Arabic.

Figure 3:
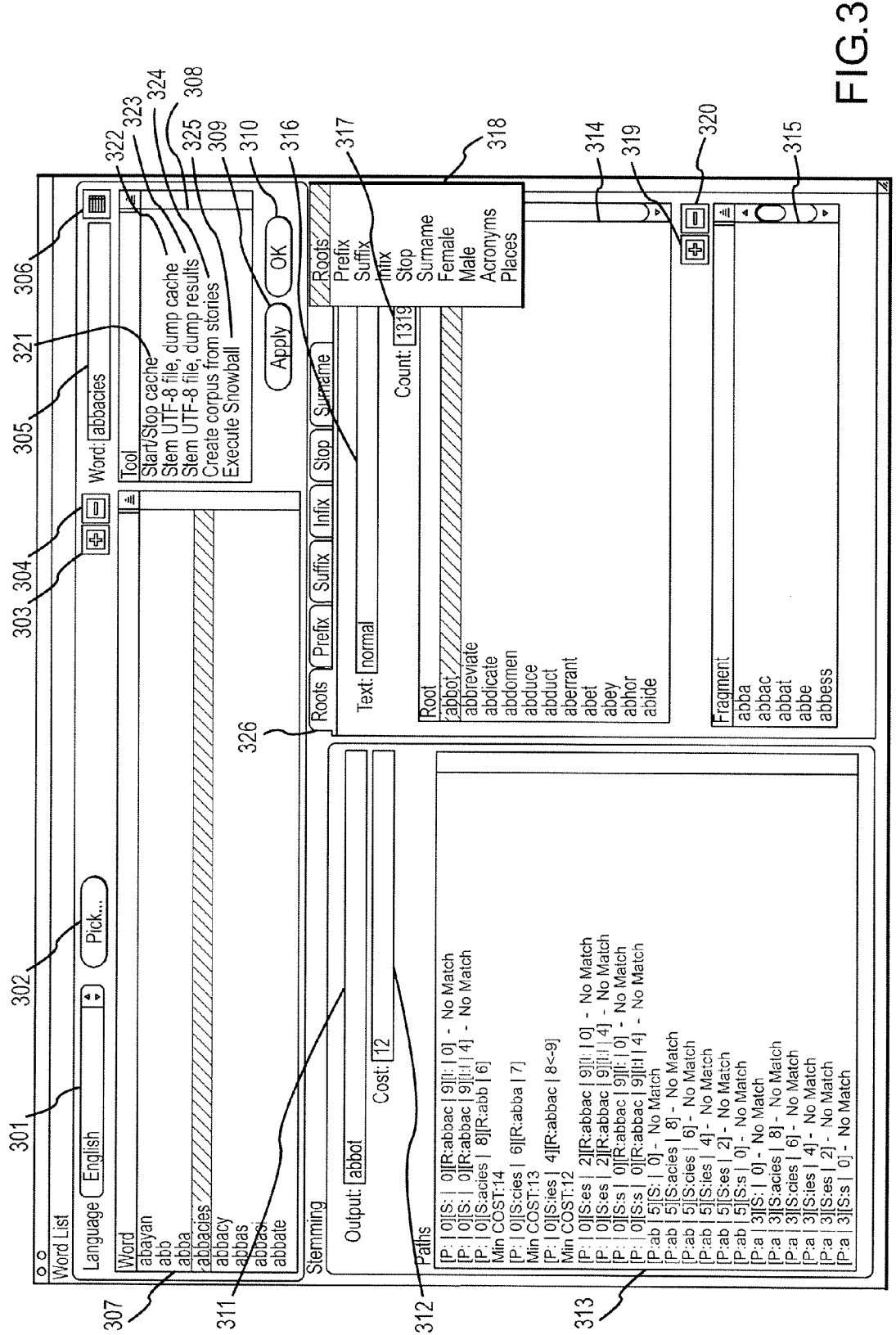
FIG. 3 shows a screen shot of an embodiment of the stemmer development window during English Stemmer Development.

FIG. 3 shows a screen shot of an embodiment of the stemmer development window during English Stemmer Development. Referring now to FIG. 3, the stemmer development window consists of three areas, the upper portion of the window is for manipulating word lists and invoking various other stemming related tools and functionality. The lower left portion provides a dump/trace of the stemming process for the word selected in the word list ("abbacies" in the case shown in FIG. 3). The lower right portion of the window contains a series of tabbed panels allowing access to the various dictionaries that are provided by the basic stemming framework and that are used by the stemming algorithm. In the screen shot shown in FIG. 3, the user has clicked on a popup tab (see Roots Popup Tab 407 in FIG. 4) associated with Roots Tab 326 of the tabbed dictionary panels revealing Roots Popup Menu 318, which shows all the dictionaries that are available, and which have been described above as part of the basic stemming framework. Language Menu 301 allows the user to choose the language for the stemmer for which development is required and in FIGS. 4 and 6 this has been set to Korean, and in FIG. 5 this has been set to Arabic. Pick Button 302 allows the user to select a word list file for the language concerned and that word list is then displayed in Word List Pane 307. Whatever word is selected in Word List Pane 307 is displayed in the Word Bar 305. Since word lists can contain hundreds of thousands of distinct words, the user may type a desired word into Word Bar 305 and click Select Button 306 to immediately navigate to the word in Word List Pane 307. If the word is not in the word list, the nearest word to that typed is selected, and the user may then choose to add the new word to the list by clicking Add Button 303. Similarly, a word can be removed from the word list by clicking on Remove Button 304.

As a word is selected in Word List Pane 307, the results of stemming that word are displayed in Stemmer Output Bar 311, the cost of the chosen path is displayed in Cost Bar 312, and the details of the shortest path search process used by the stemming algorithm are displayed in Paths List Pane 313. At the same time, the first root chosen on a successful stem is selected in Root List Pane 314 and all defined root fragments used to recognize that root are listed in Fragment List Pane 315. This same auto selection applies to the lists associated with the tabbed panels corresponding to any prefix, suffix, and first infix fragments that may have been involved in stemming the word. This automatic behavior of the UI allows a user to rapidly examine a list of words in order to ensure correct stemmer operation. If word stemming fails, Cost Bar 312 displays "Failed to Stem" and the failing word is written automatically into Root Text Bar 316, thereby facilitating the rapid addition of the missing root by clicking on an add button hidden from view in FIG. 3 (see Add Button 404 in FIG. 4) after removing any affix characters.

If a word fails to stem or stems incorrectly, the user may type the appropriate root word (i.e., the root output) into Root Text Bar 316 and click on the add button (see Add Button 404 in FIG. 4) to add it to the root word dictionary. Roots can be removed from the root word dictionary by clicking on a remove button (see Remove Button 405 in FIG. 4). Similarly, if the word has many variants all of which should be recognized as leading to the same output root, the user may type additional fragments into Root Text Bar 316 and add them to Fragment List Pane 315 by clicking Add Button 319. Fragments can be removed from the fragment list by clicking on Remove Button 320.

Figure 4:
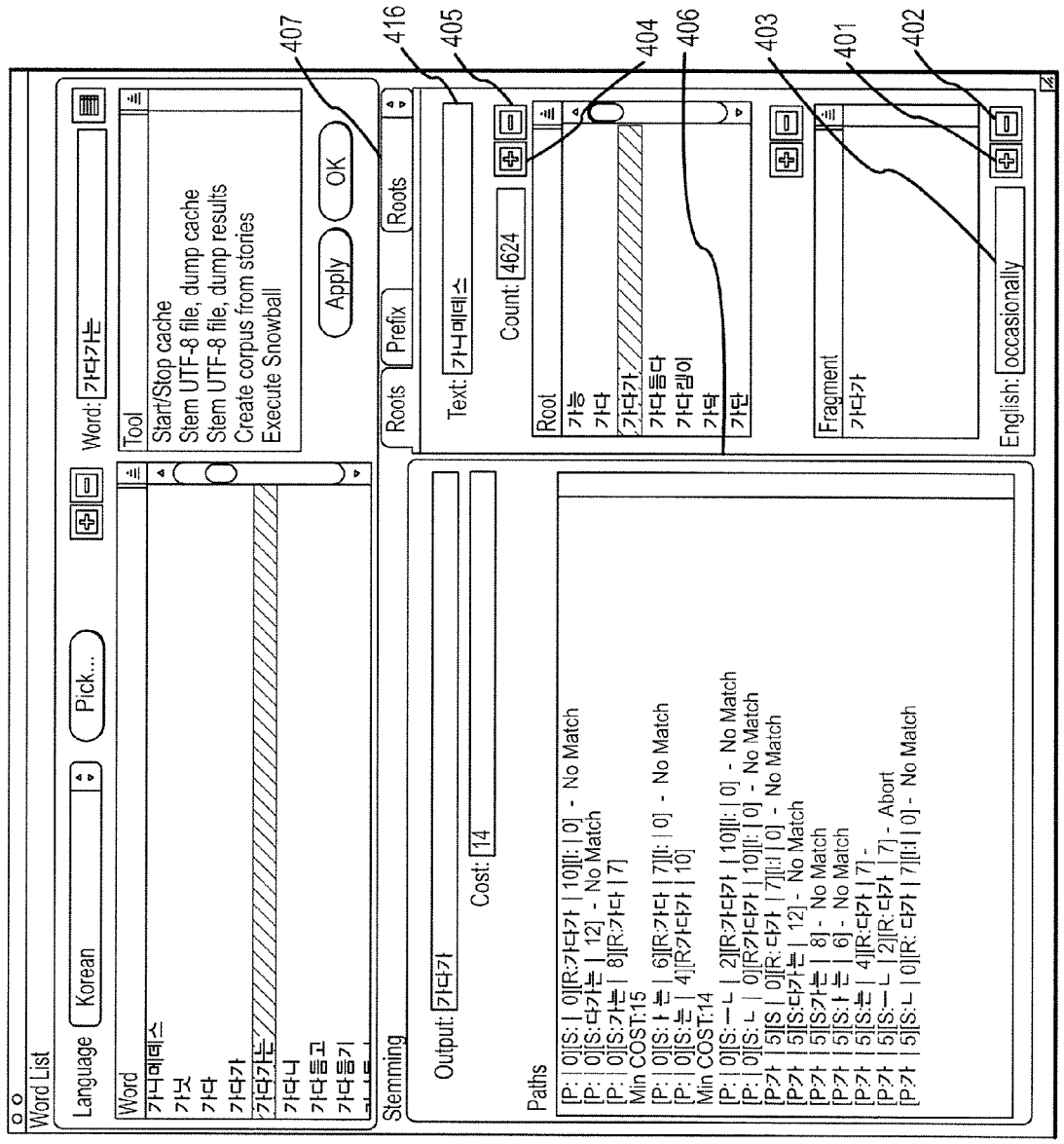
FIG. 4 shows a screen shot of an embodiment of the stemmer development window during Korean Stemmer Development.

FIG. 4 shows a screen shot of an embodiment of the stemmer development window during Korean Stemmer Development. Referring now to FIG. 4, in languages other than English, the additional controls Add Button 401, Remove Button 402, and Output Bar 403 associated with mapping language roots to the corresponding English roots are automatically displayed in the lower right corner of the window. The user may type an English root translation into Root Text Bar 416 and click Add Button 401 to add/replace it in the root mapping dictionary. Mappings can be removed from the root mapping dictionary using Remove Button 402. Note that in FIG. 4, the user has chosen to re-size the areas of the two parts that make up the lower portion of the UI by dragging Panel Re-Size Control 406.

Referring back to FIG. 3, at any time, the user can commit any changes made to the language specific dictionaries by clicking on Apply Button 309, and this automatically updates any dictionaries changed to files and then reforms/reloads the dictionaries in a manner identical to that occurring in the "makeStemmerContext" call so that the stemmer is up to date. After the stemmer is updated, the interface automatically re-stems the currently selected word in Word List Pane 307, and re-displays all impacted controls, thus allowing the user to instantly see the effect of any changes on the stemmer behavior and output. The window can be dismissed at any time by clicking OK Button 310, and the user will be provided with an appropriate alert asking him if he wishes to save any outstanding changes.

Figure 5:
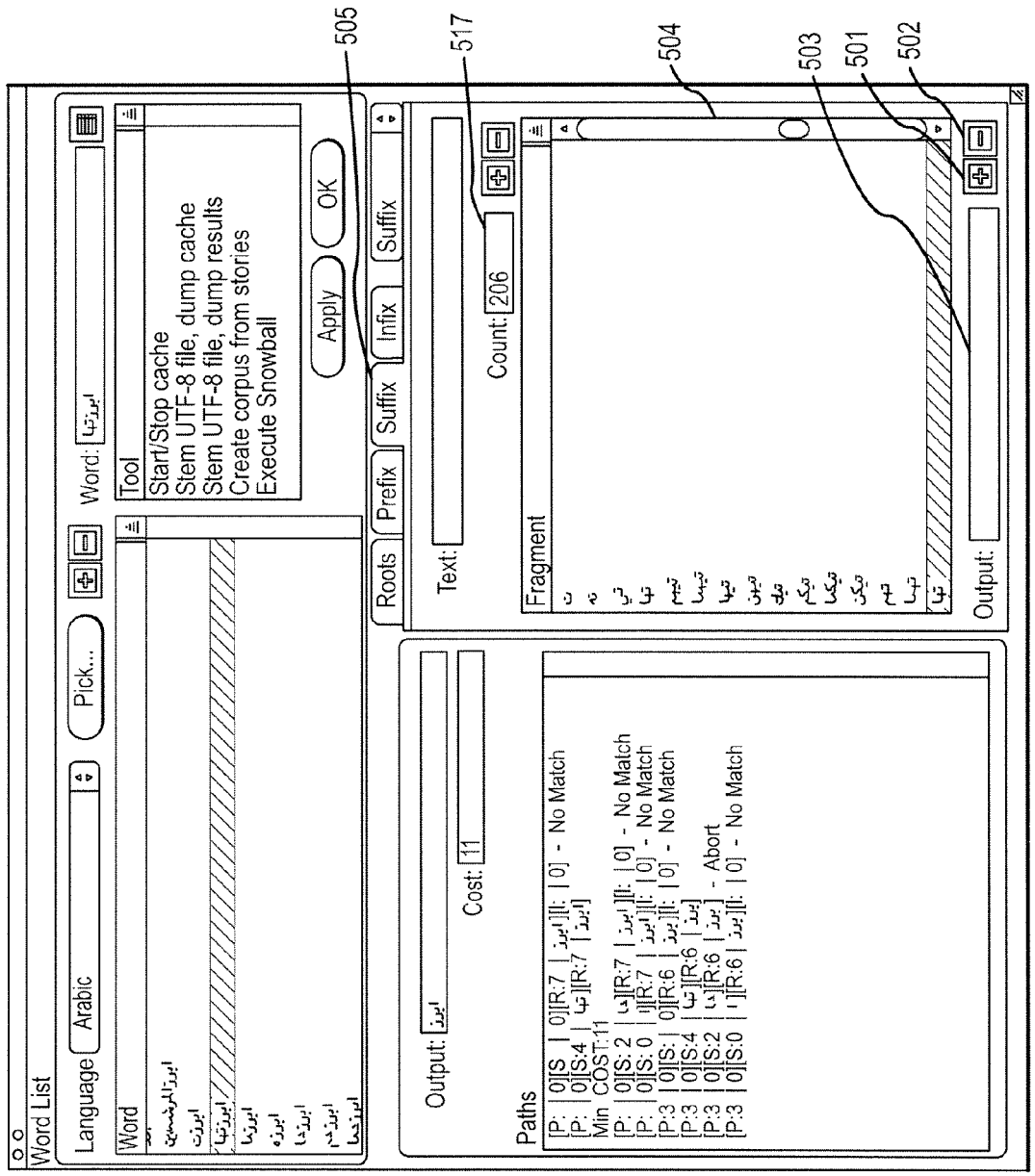
FIG. 5 shows a screen shot of an embodiment of the stemmer development window during Arabic Stemmer Development.

FIG. 5 shows a screen shot of an embodiment of the stemmer development window during Arabic Stemmer Development. Referring now to FIG. 5, whenever any tabbed panel is shown, Count Bar 517 displays the current number of items in the dictionary concerned. Note also that in FIG. 5, Suffix Tab 505 is selected (as opposed to the roots tab shown in FIGS. 3 and 4), and that unlike the root word dictionary which allows multiple fragments corresponding to a single output root, in these other dictionaries, there is a one-to-one mapping so just a single Fragment List Pane 504 is displayed, and the fragment is mapped directly to the corresponding output (if any) shown in Output Bar 503 using Add Button 501 and Remove Button 502.

Referring back now to FIG. 3, the format of the shortest path search trace displayed in Paths List Pane 313 is a series of one line entries comprised of the bracketed path segments that make up the path being explored as follows:

[P:prefix|cost]—This is the prefix sequence in effect for the path concerned and also the cost for that prefix according to the cost-calculator function. If there is no text between the ':' and the following '|' no prefix was in effect.

[S:suffix|cost]—This is the suffix sequence in effect for the path concerned and also the cost for that suffix according to the cost-calculator function. If there is no text between the ':' and the following '|' no suffix was in effect.

[I:infix|cost]—This is the infix sequence in effect for the path concerned and also the cost for that infix according to the cost-calculator function. If there is no text between the ':' and the following '|' no infix was in effect.

[R:root|cost]—This is the root sequence in effect for the path concerned and also the cost for that root according to the cost-calculator function.

Since there can be multiple roots in sequence with optional infix fragments between them, multi-root words may display a repeated series of infix and root blocks. The order of the lines appearing in the output corresponds to the search order used by the stemming algorithm to explore the paths. If a path fails to complete a successful parse, the corresponding line terminates with the text "—No Match." Also, if the stemming algorithm determines that the cost of the path exceeds the current minimum, even if it has not completely explored the path, it aborts and the line is terminated with the text "—Abort." This optimization behavior was not detailed in the description of the stemming algorithm since it is not relevant to the stemming algorithm itself but is merely a timing optimization. Occasionally for the root word cost, the form "cost<-cost" may be displayed as in FIG. 3. This is an indication that the logic associated with favoring longer trailing roots has caused the root cost to be adjusted downward in order to accomplish this feature. The trace shown in FIG. 3 for the word "abbacies" contains twenty-one different potential paths that were explored in order to stem the word, and this illustrates clearly that this stemming algorithm is very different from a conventional stemming approach. This also illustrates the importance of maximizing the efficiency of the lookup and path search in keeping the cost of the stemming algorithm within acceptable bounds. Some words may require far more paths to be examined in this way, and inefficiencies in implementation would be magnified significantly in these cases.

From the three languages chosen to illustrate the behavior of the development window, it is clear that the entire UI is multilingual and that the disclosed stemming algorithm operates in an identical manner across all languages.

Tools List Pane 308 allows the user to invoke additional stemmer related behaviors. Start/Stop Cache Tool 321 allows explicit control over the stemmer cache described previously.

Stem UTF-8 File, Dump Cache Tool 322 allows the user to select a text file and stem it, displaying the resultant stemmer cache to the lower portion of the window (temporarily replacing the stemming and dictionaries portion shown in FIGS. 3, 4, and 5). The stemmer cache maintains the result of calling all stemming algorithms and this tool is used to generate the tables shown as Table 1 and Table 2.

Stem UTF-8 File, Dump Results Tool 323 tool allows the user to examine the effect of the stemmer on an actual text file or document in order to evaluate accuracy. The effect of this tool is to stem the selected file and display the results in the lower portion of the development window.

Figure 6:
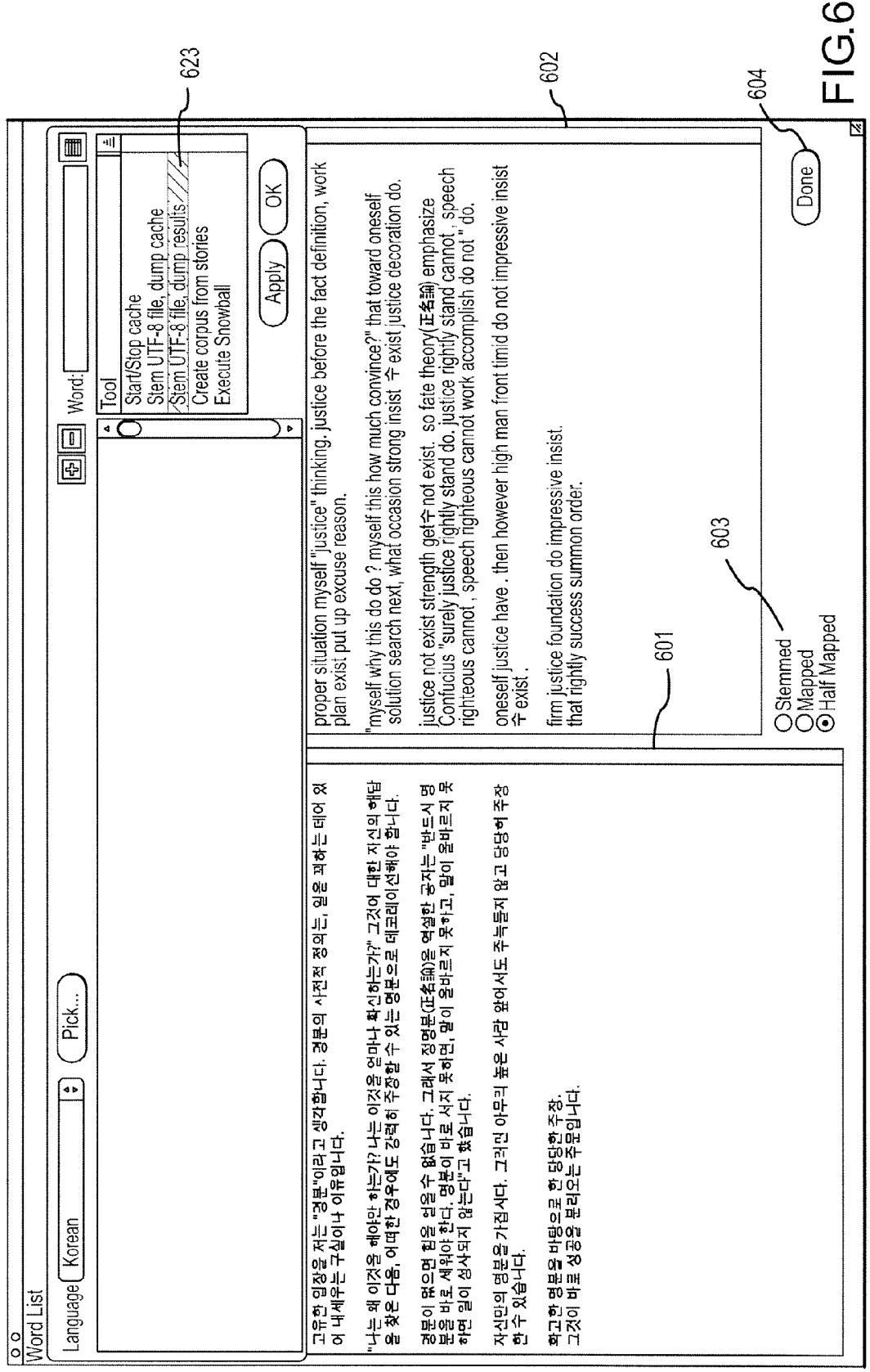
FIG. 6 shows a screen shot of an embodiment of the stemmer development window after having dumped the results of stemming a sample Korean text file.

FIG. 6 shows a screen shot of an embodiment of the stemmer development window after having dumped the results of stemming a sample Korean text file. Referring now to FIG. 6, the user has clicked on Stem UTF-8 File, Dump Results Tool 623. The contents of the original Korean text file are displayed on the left side of the lower portion of the window in Original Text Pane 601, while the text resulting from the stemming process is displayed on the right side in Stemming Text Pane 602. Radio Button Group 603 allows the user to select which form of stemming to apply and thus allows examination of all phases of the stemming process. The choices for stemmed output available are: "Stemmed," which will display the stemmed roots in the language involved; "Half Mapped," which will display the stemmed roots after root word mapping to English but before re-stemming the result using the English stemmer to ensure search consistency; and "Mapped," which displays the results of root word mapping followed by English stemming. As should be obvious from looking at FIG. 6, the result of stemming and then mapping is an English document that can be fairly easily understood by anyone even with no knowledge of Korean. This document is not a formal translation of the original text, but merely the result of the mapping process within the stemmer which is referred to as transliteration. The ability to perform rapid transliteration and search across languages as a result is important in the intelligence domain where there is insufficient time or manpower to translate all incoming text, but there is still a need to rapidly identify those documents that should be examined more carefully, perhaps by subsequently getting a formal manual translation. The development window can be returned to normal operation at any time by clicking on Done Button 604. Note that in the case shown, not all the text of the input file could be transliterated. In the case of the text between the braces ( ), the original text is actually Chinese text, not Korean. In the other cases, the un-translated symbols are small root words that have not been entered in the mapping dictionary. Note also that the transliterated text maintains all the punctuation present in the original. This fact is important in certain text searching operations. This UI makes it apparent that not only does the disclosed stemming algorithm perform well in stemming and text search applications, but it also finds utility in spell checking (note the behavior with the word "abjurdicating" in Table 1), and fast machine translation applications.

Referring back now to FIG. 3, Create Corpus From Stories Tool 324 takes advantage of the stemmer's integration into a larger database system containing a body of ingested documents/stories in order to retrieve all documents for the selected language, extract all the text from those documents, and create a word list from this text. This allows the stemmer developer to test the stemmer against representative words from the data set of the system involved, and thus ensure that stemmer behavior is optimized to this data set if necessary. Stem UTF-8 File, Dump Cache Tool 322 tool also has an optional behavior allowing the input words seen by the cache to be dumped as an alphabetized word list, and so by ingesting one or more large documents and then dumping a word list, the user has an alternative way of creating a word list.

Execute Snowball Tool 325 tool allows the user to invoke and execute Porter's Snowball language compiler in order to generate a Porter stemmer for the target language. This option is provided for historical reasons mainly, since given the performance of the disclosed stemming algorithm, it is rarely necessary to develop another stemming algorithm in this manner.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications of the invention will suggest themselves without departing from the scope of the present invention.

What is claimed is:

1. A method for stemming a word for use in a text search system running in a computing system, the method comprising the steps of:
   (a) calling a stemming algorithm to process a word;
   (b) parsing the word through a main routine of said stemming algorithm; wherein said main routine determines all possible prefixes and suffixes for the word;
   (c) parsing a remaining portion of the word through a recursive subroutine called from within said main routine, wherein said recursive subroutine determines all possible roots and infixes of the remaining portion of the word;
   (d) assigning through a cost calculator function of said stemming algorithm a cost for each of said prefixes, suffixes, roots, and infixes found;
   (e) sequencing by said stemming algorithm said prefixes, suffixes, roots, and infixes found into one or more unique paths that traverse the word;
   (f) adding up by said stemming algorithm a total cost for each of said one or more unique paths to determine a least cost path;
   (g) outputting by said stemming algorithm one or more roots found in said least cost path as a stem for the word;
   (h) performing a search with the text search system using said one or more roots for the word instead of the word itself in both a querying and a indexing phases of the search.

2. The method according to claim 1 wherein steps (b) and further comprise:
   parsing the word according to a following pattern:
   [Prefix] Root {[Infix] Root} [Suffix]
   wherein a pattern element [ . . . ] implies zero or one occurrence, and a pattern element implies zero, one, or more occurrences.

3. The method according to claim 1 further comprising the steps of:
- accessing by said stemming algorithm one or more lookup dictionaries to determine if the word is a member of a set within said one or more lookup dictionaries; and
- if the word is said member of said set, setting delimiter characters around the word to prevent said stemming algorithm from making any changes to the word;
- wherein said one or more lookup dictionaries are implemented through a lexical analyzer that is table driven.

4. The method according to claim 3 further comprising the step of:
- determining if the word is a member of a one of the following sets: male names, female names, surnames, place names, acronyms, and stop words.

5. The method according to claim 1 further comprising the step of:
- accessing by said stemming algorithm one or more mapping dictionaries to determine if the word is a member of said one or more mapping dictionaries; and
- if the word is said member of said one or more mapping dictionaries, replacing the word with one or more alternate words mapped to the word in said one or more mapping dictionaries;
- wherein said one or more mapping dictionaries are implemented through a lexical analyzer that is table driven combined with a string list functionality provided by a flat memory model.

6. The method according to claim 5 further comprising the step of
- determining if the word is a member of one of the following mapping dictionaries: common phrases mapped to equivalent meanings, irregular tense word forms, irregular plural word forms, or fix up.

7. The method according to claim 1 wherein assigning step (d) further comprises the steps of:
- determining a default cost for said prefixes according to a first formula $2*n+1$;
- determining a default cost for said suffixes according to a second formula $2*n-2$;
- determining a default cost for said roots according to a third formula $2*n/2+1$; and
- determining a default cost for said infixes according to a fourth formula $2*n+2$;
- wherein "n" is a number of characters in each of said prefixes, suffixes, roots, and infixes.

8. A system for stemming text comprising:
- a processor for processing one or more programming instructions;
- logically connected to said processor, one or more storage devices;
- one or more lookup dictionaries, stored in said one or more storage devices, which describe character sequences in a target language corresponding to one or more of the following word components: prefix, suffix, root, and infix;
- logically connected to said processor, a client application that as part of its processing presents a stream of text to be stemmed; and
- a first stemming algorithm, stored in said one or more storage devices, which is based on a shortest-path path technique, wherein said stream of text is passed to said first stemming algorithm said first stemming algorithm having a main routine for determining all prefixes and suffixes for each word of said stream of text, and having a recursive subroutine called from within said main routine to determine all possible roots and infixes of a remaining portion of each word of said stream of text, said stemming algorithm parsing one or more paths through each word in said stream of text in terms of combinations of said word components for which allowable combinations are identified by accessing said one or more lookup dictionaries, wherein a cost for any said one or more paths through said each word is a calculation from said word components involved and a number of characters in each of said word components, wherein a stemmed result for said each word is selected from said one or more paths that has a least cost to completely traverse said each word.

9. The system of claim 8 further comprising:
- one or more additional lookup dictionaries, stored on said one or more storage devices, which logically describe character sequences in said target language corresponding to one or more of the following logical sets: male names, female names, surnames, place names, acronyms, and stop words, wherein if a word in said stream of text is a member of one of said logical sets, delimiter characters are set around said word to prevent said first stemming algorithm from making any changes to said word.

10. The system of claim 9 further comprising:
- one or more mapping dictionaries, stored on said one or more storage devices, for replacing each said word in said stream of text with one or more alternate words mapped to each said word if each said word is found in said one or more mapping dictionaries, wherein said one or more mapping dictionaries include common phrases mapped to equivalent meanings, irregular tense word forms, irregular plural word forms, or fix up.

11. The system of claim 10 further comprising:
- a stemming framework logically connected to said processor which allows an invocation of one or more registered stemming algorithms for said target language, in addition to said first stemming algorithm, through one or more function call-backs within said stemming framework, together with a logic to select a best result returned by any of said one or more registered stemming algorithms or said first stemming algorithm, wherein said stemming framework also makes use of any of said one or more lookup dictionaries, said one or more additional lookup dictionaries, and said one or more mapping dictionaries that are available for said target language in order to map said stream of text presented for stemming to an alternate stream in order to overcome limitations inherent in said one or more registered stemming algorithms.

12. The system of claim 11 wherein said one or more lookup dictionaries, said one or more additional lookup dictionaries, and said one or more mapping dictionaries are provided in a plurality of languages thereby allowing operation of the system for stennning text in multiple languages.

13. The system of claim 11 wherein said one or more lookup dictionaries include a stemmed root word dictionary that maps stemmed root words in said target language to a corresponding word or phrase in a base language such that said stemming framework may choose not only to stem the said stream of text in said target language, but also to map it where possible to said base language.

14. The system of claim 13 wherein said client application utilizes said stemmed root word dictionary through said first stemming algorithm and said stemming framework in order to accomplish cross language searching or machine translation.

15. The system of claim 11 wherein said client application utilizes said stemming framework and said first stemming algorithm as part of a text search system.

16. The system of claim 11 wherein said stemming framework implements and manages a steamier cache to store a results of stemmer calls and optionally utilizes said cache in order to avoid making subsequent identical calls, thereby improving execution speed, and further wherein said stemmer cache can be dumped to an output file or device in order to allow examination of performance of said stemmer calls.

17. The system of claim 11 wherein a user interface is provided within said client application in order to allow a creation and editing of any of said one or more lookup, additional lookup, and mapping dictionaries and to immediately see a results of any changes made without the need for application re-start or code recompilation.

18. The system of claim 8 wherein said client application utilizes said first stemming algorithm as part of a spelling corrector algorithm.

19. The system of claim 11 wherein said one or more lookup dictionaries, said one or more additional lookup dictionaries, and said one or more mapping dictionaries are implemented using a lexical analyzer state transition table responsive to said stream of text or extracted word component to index into said one or more lookup, additional lookup, and mapping dictionaries.

20. The system of claim 19 wherein said lexical analyzer state transition table used to implement said one or more lookup, additional lookup, and mapping dictionaries is combined with a string list functionality provided by a flat memory model.

21. The system of claim 8 wherein said first stemming algorithm attempts to parse said each word in said stream of text into its constituent components according to a following pattern:

[Prefix] Root {[Infix] Root} [Suffix]
wherein a pattern element [ . . . ] implies zero or one occurrence, and a pattern element { . . . } implies zero, one, or more occurrences.

22. The system of claim 8 wherein said stream of text is presented and directly processed in UTF-8 encoding.

23. The system of claim 8 wherein said calculation of said word component costs is done by a cost calculator function that can be substituted as a function of said target language involved, wherein said cost calculator function further comprises:
a first formula for a default cost for said prefixes, wherein said first formula is $2*n+1$;
a second formula for a default cost for said suffixes, wherein said second formula is $2*n-2$;
a third formula for a default cost for said roots, wherein said third formula is $2*n-n/2+1$; and
a fourth formula for a default cost for said infixes, wherein said fourth formula is $2*n+2$;
where "n" is the number of characters in each of said prefixes, suffixes, roots, and infixes in said target language.

24. The system of claim 8 wherein a recognition of any given root, suffix, prefix, or infix as part of recognizing a path through an input word being stemmed can optionally result in output of one or more words to an output stream thereby allowing the system to convert said input word into one or more output words and to maintain any meaning associated with affix sequences in said input word, wherein a control logic in said one or more lookup dictionaries controls an order in which output mappings for said word components are written to said output stream.

25. The system of claim 8 wherein said first stemming algorithm can break a single multi-root input word into an output stream containing and preserving each of a stemmed roots as separate words.

* * * * *

UNITED STATES PATENT AND TRADEMARK OFFICE
CERTIFICATE OF CORRECTION

| | | |
|---|---|---|
| PATENT NO. | : 8,015,175 B2 | |
| APPLICATION NO. | : 11/687402 | |
| DATED | : September 6, 2011 | |
| INVENTOR(S) | : John Fairweather | |

It is certified that error appears in the above-identified patent and that said Letters Patent is hereby corrected as shown below:

Column 30,
line 56, Add the word -- and -- after the ";".
line 59, Delete the first occurrence of the word "a".
line 59, Delete the second occurrence of the word "a".
line 61, Add -- (c) -- after the word "and".
line 66, Add -- {...} -- between the words "element" and "implies".

Column 31,
line 42, Delete the formula "2*n/2 + 1" and replace it with the formula -- 2*n − n/2 + 1 --.

Column 32,
line 55, Delete the word "stennning" and replace it with the word -- stemming --.

Column 33,
line 5, Delete the word "steamier" and replace it with the word -- stemming --.

Signed and Sealed this
Tenth Day of July, 2012

David J. Kappos
*Director of the United States Patent and Trademark Office*